(12) United States Patent
Dern et al.

(10) Patent No.: US 8,716,374 B2
(45) Date of Patent: May 6, 2014

(54) COLOUR-STABLE LED SUBSTRATES

(75) Inventors: Gesa Dern, Düsseldorf (DE); Alexander Meyer, Düsseldorf (DE); Joerg Reichenauer, Krefeld (DE)

(73) Assignee: Bayer MaterialScience AG, Leverkusen (DE)

( * ) Notice: Subject to any disclaimer, the term of this patent is extended or adjusted under 35 U.S.C. 154(b) by 46 days.

(21) Appl. No.: 13/326,459

(22) Filed: Dec. 15, 2011

(65) Prior Publication Data

US 2012/0157586 A1 Jun. 21, 2012

(30) Foreign Application Priority Data

Dec. 17, 2010 (IT) .............................. RM2010A0668

(51) Int. Cl.
*C08K 5/34* (2006.01)
*B32B 27/00* (2006.01)
*B32B 27/36* (2006.01)

(52) U.S. Cl.
USPC ................. 524/88; 524/89; 524/90; 428/412; 428/457; 428/704

(58) Field of Classification Search
USPC ................. 524/89, 88, 90; 428/412, 457, 704
See application file for complete search history.

(56) References Cited

U.S. PATENT DOCUMENTS

| | | |
|---|---|---|
| 2,889,327 A | 6/1959 | Howard |
| 2,991,273 A | 7/1961 | Hechelhammer et al. |
| 2,999,825 A | 9/1961 | Floyd et al. |
| 2,999,846 A | 9/1961 | Schnell et al. |
| 3,028,635 A | 4/1962 | Herubel |
| 3,148,172 A | 9/1964 | Fox |
| 3,271,367 A | 9/1966 | Schnell et al. |
| 3,299,065 A | 1/1967 | Dien |
| 3,728,124 A | 4/1973 | Whyte |
| 3,846,369 A | 11/1974 | Whyte |
| 4,035,958 A | 7/1977 | Nishio |
| 4,101,513 A | 7/1978 | Fox et al. |
| 4,185,009 A | 1/1980 | Idel et al. |
| 4,395,463 A | 7/1983 | Kray |
| 4,707,393 A | 11/1987 | Vetter |
| 4,894,972 A | 1/1990 | Endoh et al. |
| 4,982,014 A | 1/1991 | Freitag et al. |
| 5,041,313 A | 8/1991 | Patel |
| 5,116,706 A | 5/1992 | Kojima et al. |
| 5,235,026 A | 8/1993 | Wulff et al. |
| 5,239,406 A | 8/1993 | Lynam |
| 5,288,778 A | 2/1994 | Schmitter et al. |
| 5,349,040 A | 9/1994 | Trinks et al. |
| 5,367,044 A | 11/1994 | Rosenquist |
| 5,391,795 A | 2/1995 | Pickett |
| 5,530,130 A | 6/1996 | Roschger et al. |
| 5,574,078 A | 11/1996 | Elwakil |
| 5,627,256 A | 5/1997 | Meier et al. |
| 5,821,380 A | 10/1998 | Holderbaum et al. |

(Continued)

FOREIGN PATENT DOCUMENTS

| | | |
|---|---|---|
| CA | 1064191 A1 | 10/1979 |
| DE | 995268 | 1/1957 |

(Continued)

OTHER PUBLICATIONS

International Search Report and Written Opinion for PCT/EP2011/072915 dated Jun. 14, 2012.

(Continued)

*Primary Examiner* — Kriellion Sanders
(74) *Attorney, Agent, or Firm* — Novak Druce Connolly Bove + Quigg LLP

(57) ABSTRACT

The present invention relates to a composition comprising, (a) a transparent or translucent polymer or polymer blend in an amount which together with components b) to g) gives 100 wt. %, (b) optionally 0 ppm to 2500 ppm of one or more stabilizers, (c) 0.001 ppm to 10,000 ppm of at least one dye comprising structure 1a and/or 1b,

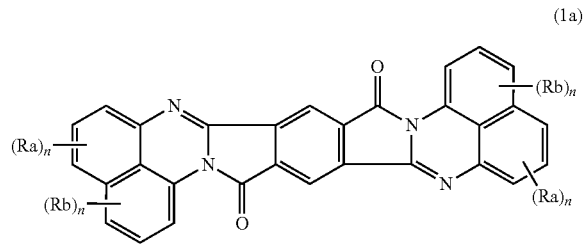

(1a)

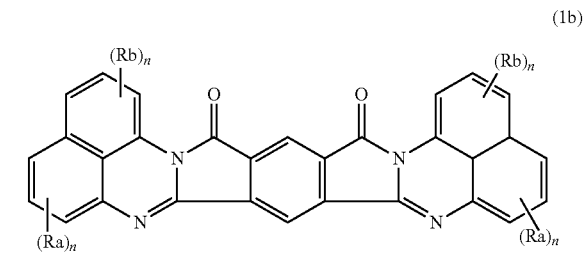

(1b)

(d) 0.001 ppm to 10,000 ppm of at least one dye selected from the group consisting of dyes differing from dyes having structure 1a and/or 1b based on perinone or indanthrone and dyes based on a phthalocyanine or phthalocyanine complex, (e) optionally 0 ppm to 3000 ppm of one or more release agents, (f) optionally 0 ppm to 6000 ppm of one or more UV absorbers, and (g) optionally 0 ppm to 500,000 ppm of one or more further additives.

20 Claims, No Drawings

(56) References Cited

U.S. PATENT DOCUMENTS

| | | | |
|---|---|---|---|
| 5,846,659 A | 12/1998 | Lower et al. | |
| 5,869,185 A | 2/1999 | Bahr et al. | |
| 5,883,165 A | 3/1999 | Krohnke et al. | |
| 5,952,096 A | 9/1999 | Yamashita et al. | |
| 6,228,973 B1 | 5/2001 | McCloskey et al. | |
| 6,350,512 B1 | 2/2002 | Hurley et al. | |
| 6,355,723 B1 | 3/2002 | van Baal et al. | |
| 6,476,158 B1 | 11/2002 | England et al. | |
| 6,613,869 B1 | 9/2003 | Horn et al. | |
| 6,860,539 B2 | 3/2005 | Watanabe et al. | |
| 7,230,113 B2* | 6/2007 | Chauhan et al. | 548/301.7 |
| 7,550,193 B2 | 6/2009 | Hu et al. | |
| 7,645,884 B2* | 1/2010 | Chauhan et al. | 548/301.7 |
| 7,728,056 B2 | 6/2010 | Kuvshinnikova et al. | |
| 2002/0120092 A1 | 8/2002 | Kratschmer et al. | |
| 2003/0094600 A1 | 5/2003 | Dobler et al. | |
| 2003/0122114 A1 | 7/2003 | Dobler et al. | |
| 2004/0131845 A1 | 7/2004 | Fujita | |
| 2004/0164446 A1 | 8/2004 | Goossens et al. | |
| 2005/0119377 A1 | 6/2005 | Ishii et al. | |
| 2005/0161642 A1 | 7/2005 | Takeda | |
| 2005/0250915 A1 | 11/2005 | Heuer et al. | |
| 2006/0105053 A1 | 5/2006 | Marx et al. | |
| 2006/0178254 A1 | 8/2006 | Takeda et al. | |
| 2006/0234061 A1 | 10/2006 | Buckel et al. | |
| 2007/0015081 A1 | 1/2007 | van den Bogerd et al. | |
| 2007/0210287 A1 | 9/2007 | Guerra | |
| 2008/0081896 A1 | 4/2008 | Heuer | |
| 2008/0103267 A1 | 5/2008 | Hurst et al. | |
| 2008/0132618 A1 | 6/2008 | Eckel et al. | |
| 2008/0258338 A1 | 10/2008 | Seidel et al. | |
| 2009/0062424 A1 | 3/2009 | Hein | |
| 2009/0136730 A1 | 5/2009 | Nakano et al. | |
| 2009/0258978 A1 | 10/2009 | Ruediger et al. | |
| 2010/0242792 A1 | 9/2010 | Loebel | |
| 2011/0293921 A1 | 12/2011 | Meyer et al. | |
| 2012/0021152 A1 | 1/2012 | Glaser et al. | |
| 2012/0153241 A1 | 6/2012 | Meyer et al. | |
| 2012/0157587 A1 | 6/2012 | Meyer et al. | |
| 2012/0162150 A1 | 6/2012 | Meyer et al. | |

FOREIGN PATENT DOCUMENTS

| | | |
|---|---|---|
| DE | 10 31 512 B | 6/1958 |
| DE | 1570703 A1 | 2/1970 |
| DE | 1569613 A1 | 6/1970 |
| DE | 2036052 A1 | 1/1972 |
| DE | 2 063 050 A1 | 7/1972 |
| DE | 2148101 A1 | 4/1973 |
| DE | 2211956 A1 | 10/1973 |
| DE | 2407674 A1 | 10/1974 |
| DE | 25 00 092 A1 | 7/1976 |
| DE | 2804283 A1 | 8/1978 |
| DE | 3121385 A1 | 8/1982 |
| DE | 3742881 A1 | 7/1988 |
| DE | 3832396 A1 | 2/1990 |
| DE | 42 40 313 A1 | 6/1994 |
| DE | 19636032 A1 | 3/1998 |
| DE | 19 943 642 A1 | 3/2001 |
| DE | 10006208 A1 | 8/2001 |
| DE | 10022037 A1 | 11/2001 |
| DE | 10311063 A1 | 9/2004 |
| DE | 10392543 T5 | 4/2005 |
| DE | 102006055479 A1 | 5/2008 |
| DE | 102007011069 A1 | 9/2008 |
| EP | 0 110 238 A2 | 6/1984 |
| EP | 0110221 A2 | 6/1984 |
| EP | 0 481 319 A2 | 4/1992 |
| EP | 0 500 496 A1 | 8/1992 |
| EP | 0517044 A2 | 12/1992 |
| EP | 0 570 165 A2 | 11/1993 |
| EP | 0639624 A1 | 2/1995 |
| EP | 0 716 919 A2 | 6/1996 |
| EP | 0718354 A2 | 6/1996 |
| EP | 0839623 A1 | 5/1998 |
| EP | 1308084 A1 | 5/2003 |
| EP | 1506249 A1 | 2/2005 |
| EP | 1559743 A1 | 8/2005 |
| EP | 1582549 A1 | 10/2005 |
| EP | 1624012 A1 | 2/2006 |
| EP | 1865027 A1 | 12/2007 |
| EP | 2009057 A1 | 12/2008 |
| FR | 1561518 A | 3/1969 |
| GB | 1122003 A | 7/1968 |
| GB | 1229482 A | 4/1971 |
| GB | 1341318 A | 12/1973 |
| GB | 1367790 A | 9/1974 |
| JP | 61-062039 | 3/1986 |
| JP | 61-062040 | 3/1986 |
| JP | 61-105550 | 5/1986 |
| JP | 4328154 A | 11/1992 |
| JP | 07033969 A | 2/1995 |
| JP | 2003-277045 A | 10/2003 |
| JP | 2005-047179 A | 2/2005 |
| JP | 2005344006 A | 12/2005 |
| JP | 2006249345 A | 9/2006 |
| JP | 2006-307172 A | 11/2006 |
| JP | 2007-169503 A | 7/2007 |
| JP | 2008-156386 A | 7/2008 |
| JP | 2008-214596 A | 9/2008 |
| WO | WO-96/15102 A2 | 5/1996 |
| WO | WO-0226862 A1 | 4/2002 |
| WO | WO-03/074584 A1 | 9/2003 |
| WO | WO-2005030851 A1 | 4/2005 |
| WO | WO-2005037932 A1 | 4/2005 |
| WO | WO-2005113639 A1 | 12/2005 |
| WO | WO-2006/108520 A1 | 10/2006 |
| WO | WO-2007/008476 A2 | 1/2007 |
| WO | WO-2007/067462 A1 | 6/2007 |
| WO | WO-2007/130607 A1 | 11/2007 |
| WO | WO-2008037364 A1 | 4/2008 |
| WO | WO-2008/071363 A2 | 6/2008 |
| WO | WO-2008/109072 A1 | 9/2008 |
| WO | WO-2008122359 A1 | 10/2008 |
| WO | WO-2008/134517 A1 | 11/2008 |
| WO | WO-2009/064860 A1 | 5/2009 |
| WO | WO-2009 074504 A2 | 6/2009 |
| WO | WO-2010/092013 A1 | 8/2010 |
| WO | WO-2011/141369 A1 | 11/2011 |

OTHER PUBLICATIONS

International Search Report and Written Opinion for PCT/EP2011/072909, dated Jan. 18, 2012.
Italian Search Report for IT RM20100670 dated Dec. 5, 2011.
U.S. Appl. No. 13/326,419.
U.S. Appl. No. 13/326,480.
U.S. Appl. No. 13/326,438.
International Search Report dated Jan. 20, 2012.
Translation of DE2148101, 2013, Mar. 2013.

* cited by examiner

COLOUR-STABLE LED SUBSTRATES

CROSS REFERENCE TO RELATED APPLICATIONS

Priority is claimed to Italian Patent Application No. RM 2010 A 000668, filed Dec. 17, 2010, which is incorporated herein by reference, it its entirety, for all useful purposes.

BACKGROUND

The invention relates to a transparent or translucent thermoplastic moulding composition containing a dye mixture containing at least one dye of the structure 1a) and/or 1b) and at least one further dye selected from the group comprising perinone-based dyes differing from structure 1a) or 1b) and dyes based on a phthalocyanine, phthalocyanine complex or indanthrone.

The invention relates in particular to transparent or translucent thermoplastic moulding compositions containing such a dye mixture for the production of optical components, such as for example lenses, or optical fibres, which exhibit an elevated colour stability when exposed to LED light, as well as to their production and use.

The invention also relates to transparent or translucent moulding compositions containing such a dye mixture for the production of optical components, such as for example lenses, or optical fibres, wherein if a specific colour location is established by colour correction using the dyes according to the invention these moulding compositions demonstrate a higher transmission for LED light than moulding compositions corrected with other dyes.

Unlike conventional illuminants such as incandescent light bulbs or fluorescent tubes, LEDS have a different emission characteristic. Lenses, light guides or optical fibres often have to be used for applications which require the light beam to be directed. Alternatively or additionally, illuminants with LEDs as the light source generally contain a transparent or translucent housing section serving to cover the light source, which protects the light source and shields it from external influences such as dirt and dust.

Owing to their long life, low energy consumption and good light yield, LEDs are increasingly being used as illumination sources, for example in the automotive industry, aviation, interior lighting, facade design, etc.

Incandescent light bulbs are disadvantageous because of their poor efficiency in terms of light emission and high evolution of heat as well as their short life. Energy-saving bulbs are much more energy efficient, but because of their content of heavy metals, in particular mercury, they are highly environmentally damaging and have to be disposed of as special waste. Alternative concepts to conventional illumination sources and modules such as incandescent light bulbs or energy-saving bulbs are sought after in terms of sustainability and energy efficiency.

Semiconductor technology (in the form of LEDs, OLEDs or electroluminescent films) offers an alternative illumination source which does not exhibit these disadvantages and which in addition has a long life and high energy efficiency. LEDs are a preferred use of semiconductor technology as a light source.

LEDs radiate light at a wavelength that is dependent on the semiconductor material and doping, such that almost monochromatic light, even in the infrared or UV range, can be generated with LEDs.

To generate visible white light, which is known to be a mixture of different wavelengths, the monochromatic light of LEDs therefore has to be "converted" (for example by additive colour mixing), which in principle is possible by various means:

1. Colour mixing by combining a blue, a red and a green emitting LED to form RGB (red green blue) modules, the combined perceived light impression of which is white.
2. By means of luminescence techniques in which all or part of the LED radiation is converted to other wavelengths using phosphors for example.

Thus white light can be generated from an LED which radiates blue light in the visible range by the addition of a single phosphor, which converts part of the radiation in the blue range into red/yellow light. This form of generating white light is preferred for commercial applications for cost reasons and because of the high efficiency of blue LEDs.

Alternatively, white light can be produced from UV light generated with LEDs with the aid of three different phosphors emitting wavelengths corresponding to an RGB module. If this method is used, compositions are preferred which also have elevated stability in respect of UV radiation, in other words which are UV-stabilised for example.

Where necessary the above light sources can be still further modified to establish an overall colour impression other than "white" in LED modules. This modification can take place for example by:
  Combination with a phosphorescent dye or
  Combination with additional light sources with a different emission characteristic.

If transparent or translucent plastics are used for lenses, optical fibres, covers or other components of a lighting device, the focus is on the light stability of the light source used. This is preferably in the range that is visible to the human eye, since these lighting devices are designed for use by people. Emissions outside the visible range mean a loss of energy and hence a reduced efficiency of the light source. There is therefore a need for a transparent or translucent plastic composition having high colour stability in respect of the emission spectrum of such a light source. In the case of a thermoplastic composition the production of such components also requires good flowability in order to be able to manufacture complex geometries by simple means. Such components should be able to be connected to the other elements of the lighting device by means of integrated elements such as plug-in or screw connectors, for example, and therefore require good mechanical strength. In addition, elevated heat resistance is required in order to be able to withstand the usage temperatures of the lighting device on a lasting basis without changes to the optical, geometric or other properties.

Lenses, optical fibres, transparent or translucent covers and other transparent or translucent components in illuminants can be produced from transparent or translucent polymers. Injection mouldable transparent or translucent thermoplastics and thermoplastic compositions selected from the group encompassing polycarbonate (PC), copolycarbonate, polyester carbonate, polystyrene (PS), styrene copolymers, polyalkylenes such as polyethylene (PE) and polypropylene (PP), aromatic polyesters such as polyethylene terephthalate (PET) and polybutylene terephthalate (PBT), PET-cyclohexane dimethanol copolymer (PETG), polyethylene naphthalate (PEN), poly- or copolymethyl methacrylates such as polymethyl methacrylate (PMMA), polyimides (e.g. PMMI), polyether sulfones, thermoplastic polyurethanes, cyclic olefin polymers or copolymers (COP or COC), or mixtures of the cited components, provided these mixtures are transparent or translucent, are suitable in particular for this purpose.

Additional dyes are frequently added to such transparent or translucent materials in order to change the colour impression or colour temperature of the light.

Stable dyes are known per se and are described in the literature. Thus U.S. Pat. No. 6,476,158 describes opaque, i.e. not transparent or translucent, polycarbonate-based compositions (polycarbonate-polyester blends) having a particularly high stability with regard to artificial weathering. Dyes which have a high weathering resistance or which contribute to maintaining gloss after weathering are also mentioned in this application.

U.S. Pat. No. 6,355,723 discloses similar dyes to U.S. Pat. No. 6,476,158, which because of their thermal stability are suitable in principle for being incorporated into polycarbonate. However, no information is given about stability with regard to radiation of any type and in particular in the visible range.

In the production and use of optical components such as lenses, optical fibres and covers made from compositions known in the prior art, however, it was found that they are changed by LED light. In particular, the optical properties, e.g. the yellowness index (YI), are changed to an unacceptable extent.

This is particularly unexpected, since LED light contains no significant proportion of UV radiation (<360 nm), which along with thermal influences is substantially responsible for the discoloration of transparent or translucent thermoplastics.

Surprisingly it was found furthermore that the anthraquinone-based dyes, which are described in U.S. Pat. No. 6,476,158 as being lightfast and colour-stable in polycarbonate, are inadequately stable in respect of light in the visible range, in particular LED light. The person skilled in the art would assume that dyes which in particular are also stable in respect of sunlight, which contains a high-energy and potentially highly damaging UV component (<360 nm), should really also be suitable for such applications exposed to LED light.

This poses the unexpected problem for the person skilled in the art that other dye classes or substances too, such as methine dyes or phthalocyanines, which are generally believed to exhibit high lightfastness and colour stability in respect of weathering influences, are not necessarily suitable for applications involving exposure to LED light.

Furthermore it is often necessary to combine a plurality of dyes to establish a certain colour impression.

Thus it is not obvious to the person skilled in the art from the existing prior art which dyes are stable in respect of LED radiation. Therefore no dyes or dye combinations for use in components exposed to LED light are known from the prior art.

EMBODIMENTS OF THE INVENTION

An embodiment of the present invention is a composition comprising,
- a) a transparent or translucent polymer or polymer blend in an amount which together with components b) to g) gives 100 wt. %,
- b) optionally 0 ppm to 2500 ppm of one or more stabilisers,
- c) 0.001 ppm to 10,000 ppm of at least one dye comprising structure 1a and/or 1b,

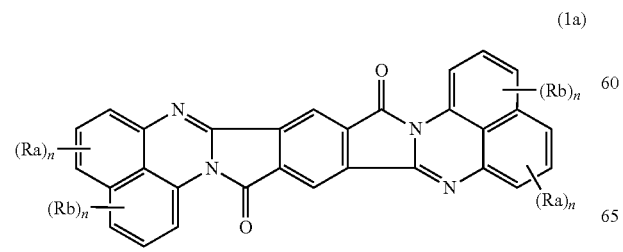

(1a)

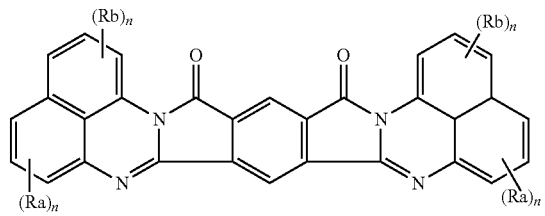

(1b)

wherein
- Ra and Rb, independently of one another, represent a linear or branched alkyl radical, or a halogen;
- n, independently of one another, represents a natural number between 0 and 3, wherein, in the case of n=0, the radical would be hydrogen;
- d) 0.001 ppm to 10,000 ppm of at least one dye selected from the group consisting of dyes differing from dyes having structure 1a and/or 1b based on perinone or indanthrone and dyes based on a phthalocyanine or phthalocyanine complex,
- e) optionally 0 ppm to 3000 ppm of one or more release agents,
- f) optionally 0 ppm to 6000 ppm of one or more UV absorbers,
- g) optionally 0 ppm to 500,000 ppm of one or more further additives.

Another embodiment of the present invention is the above composition, wherein the transparent or translucent polymer or polymer blend comprises polycarbonate.

Another embodiment of the present invention is the above composition, wherein components c) and d) are each included in a proportion of 0.01 ppm to 5 ppm in addition to components a), b), e), f) and g).

Another embodiment of the present invention is the above composition, wherein components c) and d) are each included in a proportion of 10 ppm to 500 ppm in addition to components a), b), e), f) and g).

Another embodiment of the present invention is the above composition, wherein component d) is a dye selected from the group consisting of dyes having structures 2a, 2b, 3a, 3b and 4

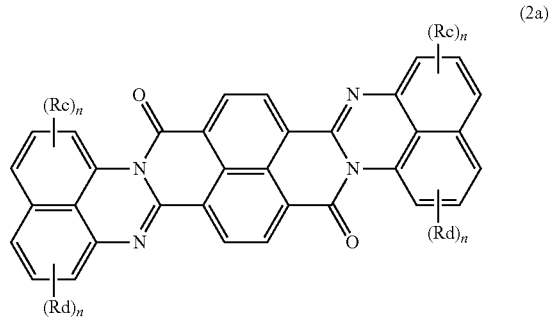

(2a)

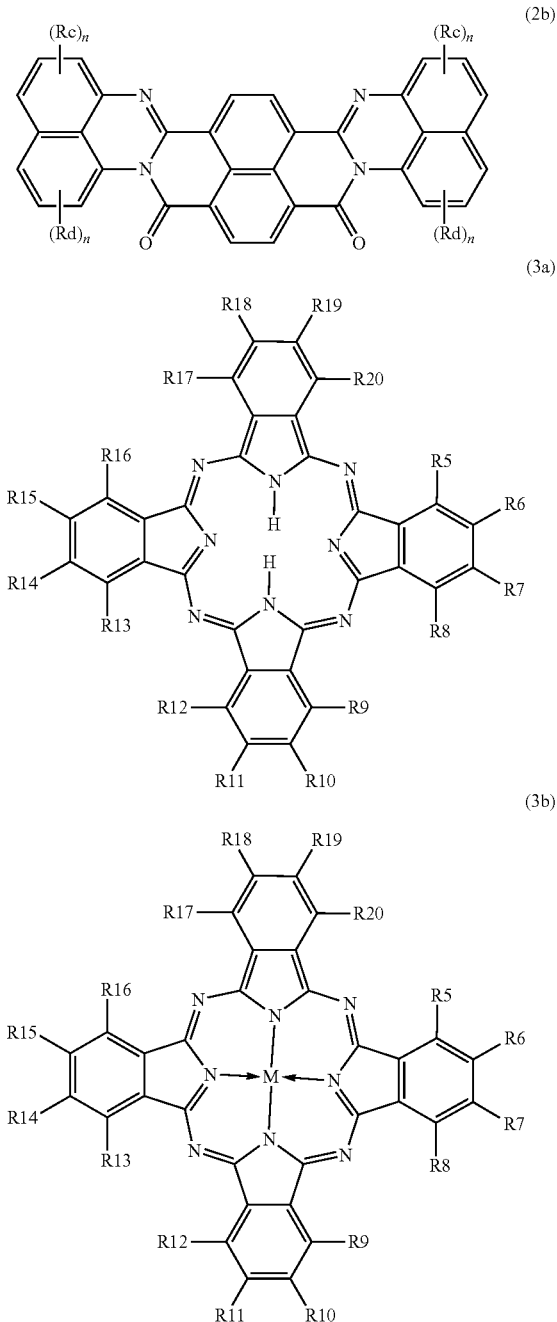

wherein
R1 and R2, independently of one another, represents a linear or branched alkyl radical, or halogen;
n denotes a natural number between 0 and 4.

Another embodiment of the present invention is the above composition, wherein the ratio of c) to d) is 1:1.

Another embodiment of the present invention is the above composition, wherein components c) and d) are used as mixtures of isomers, and wherein the proportion of isomers in the individual mixtures are 1:1.

Another embodiment of the present invention is the above composition, wherein components c) and d) are each used as pure isomers.

Another embodiment of the present invention is the above composition, wherein the composition has a transmission, measured on 4-mm-thick specimens in accordance with ISO 13468-2, of at least 80% and a haze of at most 5%.

Another embodiment of the present invention is the above composition, wherein the composition is translucent and has a transmission (measured on 4-mm-thick specimens in accordance with ISO 13468-2) of less than 80% and greater than 20% and/or a haze of greater than 5%.

Another embodiment of the present invention is the above composition, wherein component c is a substance corresponding to structures 1a and 1b with n=0 in all rings, such that all Ra and Rb are hydrogen, and wherein structures 1a and 1b are present side by side in a ratio of 1:1.

Another embodiment of the present invention is the above composition, wherein component d is a substance corresponding to structures 2a and 2b with n=0 in all rings, such that all Ra and Rb are hydrogen, and wherein structures 2a and 2b are present side by side in a ratio of 1:1.

Another embodiment of the present invention is the above composition, wherein component d is a substance corresponding to structure 3b, wherein all R(5-20) are hydrogen and M is Cu.

Another embodiment of the present invention is the above composition, wherein component d is a substance corresponding to structure 4, wherein R1 and R2 are hydrogen.

wherein for (2a) and (2b)
Rc and Rd, independently of one another, represent a linear or branched alkyl radical, or halogen;
n, independently of one another, represents a natural number between 0 and 3, wherein, in the case of n=0, the radical would be hydrogen;
and wherein for (3a) and (3b)
the radicals R(5-20) represent, independently of one another, hydrogen, methyl, ethyl, propyl, isopropyl, butyl, isobutyl, tert-butyl, pentyl, neopentyl, hexyl, thexyl, fluorine, chlorine, bromine, sulfone or CN, and
M represents an element selected from the group consisting of aluminium, nickel, cobalt, iron, zinc, copper and manganese;

Yet another embodiment of the present invention is a colored molded object obtained from a composition comprising
a) 0.001 ppm to 10,000 ppm of at least one dye comprising structure 1a and/or 1b,

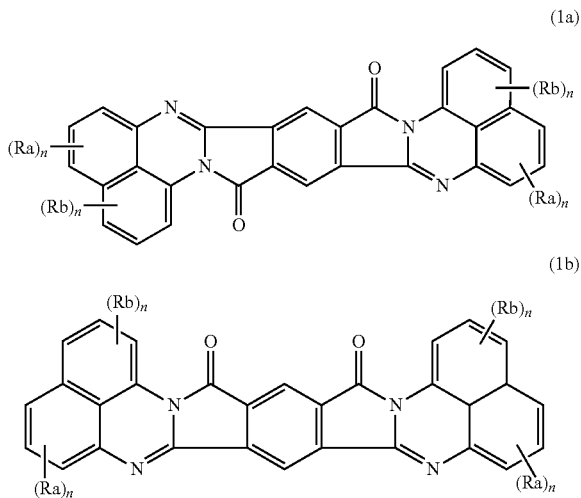

wherein
Ra and Rb, independently of one another, represent a linear or branched alkyl radical, or a halogen;
n, independently of one another, represents a natural number between 0 and 3, wherein, in the case of n=0, the radical would be hydrogen; and
b) 0.001 ppm to 10,000 ppm of at least one dye selected from the group consisting of dyes differing from dyes having structure 1a and/or 1b based on perinone or indanthrone and dyes based on a phthalocyanine or phthalocyanine complex,
wherein the colored molded objects have a high color stability when exposed to LED light.

DETAILED DESCRIPTION OF THE INVENTION

As used herein, the singular terms "a" and "the" are synonymous and used interchangeably with "one or more" and "at least one," unless the language and/or context clearly indicates otherwise. Accordingly, for example, reference to "a polymer" herein or in the appended claims can refer to a single polymer or more than one polymer. Additionally, all numerical values, unless otherwise specifically noted, are understood to be modified by the word "about."

Within the meaning of the invention transparent moulding compositions are those having a transmission of at least 80% (measured with a thickness of 4 mm in accordance with ISO 13468-2) and a haze of less than 5.0%, preferably 4.0%, more preferably less than 3.0%, particularly preferably less than 2.0%. Moulding compositions having a transmission (measured at a thickness of 4 mm in accordance with ISO 13468-2) of less than 80% and greater than 20%, more preferably less than 80% and greater than 50%, and/or a haze of greater than 5.0% and a maximum of 80.0% are classed as translucent within the meaning of the present invention.

Within the meaning of the present invention "LED light" is understood to be light having a radiation characteristic wherein more than 70% of the emitted intensity in the range from 100 nm to 3000 nm is in the visible range (within the meaning of the present invention the visible range is defined as the wavelength range from 360 nm to 780 nm). In particular, less than 5% of the intensity is in the range <360 nm. Looking at the range between 360 nm and 500 nm, LED light in the context of the present invention preferably has a dominant wavelength (local maximum) between 360 nm and 480 nm, more preferably between 400 nm and 480 nm, and particularly preferably between 430 nm and 470 nm (boundary values included in all cases).

This dominant wavelength must emit light with a white colour impression, particularly in LED modules, but is not the dominant emission (=highest intensity) across the entire visible spectrum.

In the context of the present invention, "LED light" indicates a local maximum in the range between 360 nm and 480 nm, with a narrow emission width having a half-width value of a maximum of 60 nm, more preferably a maximum of 45 nm, still more preferably a maximum of 30 nm, monochromatic light being particularly preferred.

In an alternative embodiment LED light has a local maximum (in the range between 360 nm and 500 nm) of 400 nm to 405 nm inclusive. Such emission characteristics are achieved inter alia through the use of semiconductors or lasers as a light source. Semiconductor technology is already commonly used today, for example in LEDs (light-emitting diodes), organic LEDs (OLEDs) and electroluminescent films.

The object underlying the present invention was to provide colour-corrected or dyed thermoplastic moulding compositions which are exposed to LED light, which during operation of the light source display no or only minimal colour changes of the substrate material due to LED light and which at the same time have good flowability, high mechanical integrity, high heat resistance and a high refractive index.

The colour of the thermoplastic moulding composition must not change or may change only insubstantially during the life of the LED.

To this end it is essential that the absorption behaviour established by the added dye, which ultimately leads to the desired colour impression, remains as constant as possible under exposure to LED light. With this in mind the intensity of a characteristic absorption band for a specific dye may vary by no more than 50%, preferably no more than 40%, particularly preferably no more than 30%.

Alternatively, the stability of the dye that is used can be assessed by its degradation over a defined time under exposure to LED light. To this end a correlation can be established between the characteristic absorption bands and the concentration of dye present in the sample by means of the Beer-Lambert law. The change in concentration, in other words the percentage degradation of the dye, over the period of the test, can be calculated in this way.

A further option for determining the stability of the dye can be developed from the change in the optical properties. Common optical parameters for example, such as transmission or yellowness index, can be used for this assessment.

In order to ensure an adequate flowability of the thermoplastic moulding composition and hence an adequately good processability, the MVR (measured in accordance with ISO 1133 at 300° C. and 1.2 kg) must be between 5 $cm^3/(10\ min)$ and 80 $cm^3/(10\ min)$, preferably between 12 $cm^3/(10\ min)$ and 80 $cm^3/(10\ min)$, more preferably between 35 $cm^3/(10\ min)$ and 80 $cm^3/(10\ min)$ and particularly preferably between 60 $cm^3/(10\ min)$ and 80 $cm^3/(10\ min)$.

For an adequate mechanical stability for the integration of fixing elements such as for example snap-in hooks, plug-in and screw connectors, the notched impact resistance of the thermoplastic moulding compositions (measured in accordance with ISO 179/1eA at room temperature on 3-mm-thick specimens) must be at least 40 kJ/m², preferably between 50 kJ/m² and 130 kJ/m², more preferably between 55 kJ/m² and 120 kJ/m² and particularly preferably between 55 kJ/m² and 70 kJ/m².

The material must have high heat resistance in order to withstand the elevated temperatures during operation of the lighting unit and not to lose its exact shape. The Vicat softening point (measured in accordance with ISO 306 (50N, 120° C./h)) must be at least 70° C. The Vicat softening point is preferably between 120° C. and 220° C., more preferably between 130° C. and 200° C., still more preferably between 140° C. and 180° C., particularly preferably between 140° C. and 150° C.

The refractive index of the material (measured in accordance with ISO 489, method A) must be at least 1.400. The refractive index is preferably between 1.450 and 1.600, more preferably between 1.480 and 1.590, still more preferably between 1.500 and 1.590, particularly preferably between 1.550 and 1.590.

The object of the present invention was surprisingly achieved by thermoplastic moulding compositions according to claim 1 of the present invention, which contain a specific combination of selected dyes and, in a preferred embodiment, specific stabilisers, and by illuminants containing these substrate materials.

The moulding compositions according to the invention contain, relative to their overall composition,
a) transparent or translucent polymer or polymer blend in an amount which together with components b) to g) gives 100 wt. %,
b) optionally 0 to 2500 ppm, preferably 20 ppm to 2000 ppm, more preferably 100 ppm to 1500 ppm, particularly preferably 200 ppm to 1000 ppm, of one or more stabilisers,
c) 0.001 ppm to 10,000.000 ppm, preferably 0.005 ppm to 1000.000 ppm, more preferably 0.01 ppm to 500.00 ppm, particularly preferably 0.01 ppm to 5.00 ppm, of at least one dye of structure 1a and/or 1b,
d) 0.001 ppm to 10,000.000 ppm, preferably 0.005 ppm to 1000.000 ppm, more preferably 0.01 ppm to 500.00 ppm, particularly preferably 0.01 ppm to 5.00 ppm, of at least one dye from the group comprising perinone-based dyes differing from structure 1a and/or 1b and dyes based on an indanthrone, a phthalocyanine and/or a phthalocyanine complex,
e) optionally 0 ppm to 3000 ppm, preferably 100 ppm to 1000 ppm, more preferably 150 ppm to 500 ppm, of one or more release agents,
f) optionally 0 ppm to 6000 ppm, preferably 500 ppm to 5000 ppm, more preferably 1000 ppm to 2000 ppm, of one or more UV absorbers,
g) optionally 0 ppm to 500,000 ppm, preferably 100 ppm to 100,000 ppm, more preferably 500 ppm to 50,000 ppm, of one or more additives.

In the case of colour-neutral formulations components c) and d) are each preferably included in a proportion of 0.001 ppm to 5.000 ppm in addition to components a), b), e), f) and g), whereas intensively coloured formulations contain components c) and d) in a proportion of by preference greater than 5.000 ppm to 10,000.000 ppm, by preference moreover 10 ppm to 5000 ppm, more preferably 10 ppm to 1000 ppm and particularly preferably 10 ppm to 500 ppm in addition to components a), b), e), f) and g).

Component a)

The transparent polymer a) is preferably a transparent or translucent thermoplastic, preferably polycarbonate (PC), copolycarbonate, polyester carbonate, polystyrene (PS), styrene copolymers, polyalkylenes such as polyethylene (PE) and polypropylene (PP), aromatic polyesters such as polyethylene terephthalate (PET) and polybutylene terephthalate (PBT), PET-cyclohexane dimethanol copolymer (PETG), polyethylene naphthalate (PEN), poly- or copolymethyl methacrylates such as polymethyl methacrylate (PMMA), polyimides (e.g. PMMI), polyether sulfones, thermoplastic polyurethanes, cyclic olefin polymers or copolymers (COP or COC), more preferably polycarbonate, copolycarbonate, aromatic polyesters, cyclic olefin polymers or copolymers or polymethyl methacrylate, or mixtures of the cited components, provided these mixtures are transparent or translucent, and particularly preferably polycarbonate and copolycarbonate.

In an alternative embodiment the transparent polymer a) can also be or contain a thermoset or a mixture of thermosets having the corresponding optical properties.

Mixtures of a plurality of transparent or translucent polymers are also possible, provided that they are transparently or translucently miscible with one another, a mixture of polycarbonate with PMMA or polyester being preferred.

A preferred embodiment contains as component a) a mixture of polycarbonate and PMMA containing less than 2%, preferably less than 1%, more preferably less than 0.5%, still more preferably containing 0.2% and particularly preferably containing 0.1% PMMA relative to the amount of polycarbonate, the PMMA preferably having a molecular weight of <40,000 g/mol.

A further alternative embodiment contains a mixture of PMMA and PC containing less than 2%, preferably less than 1%, more preferably less than 0.5%, still more preferably containing 0.2% and particularly preferably 0.1% polycarbonate relative to the amount of PMMA.

Polycarbonates within the meaning of the present invention are both homopolycarbonates and copolycarbonates; the polycarbonates can be linear or branched in a known manner.

The polycarbonates are produced in a known manner from diphenols, carbonic acid derivatives, optionally chain terminators and branching agents.

Details of the production of polycarbonates have been set out in many patent specifications over the last 40 years or so. By way of example reference is made here to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouverné, BAYER AG, "Polycarbonates" in Encyclopedia of Polymer Science and Engineering, Volume 11, Second Edition, 1988, pages 648-718, and finally to Drs. U. Grigo, K. Kirchner and P. R. Müller "Polycarbonate" in Becker/Braun, Kunststoff-Handbuch, Volume 3/1, Polycarbonate, Polyacetale, Polyester, Celluloseester, Carl Hanser Verlag Munich, Vienna 1992, pages 117-299.

Suitable diphenols for the production of polycarbonates are for example hydroquinone, resorcinol, dihydroxydiphenyls, bis(hydroxyphenyl)alkanes, bis(hydroxyphenyl)cycloalkanes, bis(hydroxyphenyl)sulfides, bis(hydroxyphenyl) ethers, bis(hydroxyphenyl)ketones, bis(hydroxyphenyl) sulfones, bis(hydroxyphenyl)sulfoxides, alpha, alpha'-bis (hydroxyphenyl)diisopropylbenzenes, phthalimidines derived from isatine or phenolphthaleine derivatives and ring-alkylated, ring-arylated and ring-halogenated compounds thereof.

Preferred diphenols are 4,4'-dihydroxydiphenyl, 2,2-bis-(4-hydroxyphenyl)propane, 2,4-bis-(4-hydroxyphenyl)-2-methylbutane, 1,1-bis-(4-hydroxyphenyl)-p-diisopropylbenzene, 2,2-bis-(3-methyl-4-hydroxyphenyl)propane, 2,2-bis-(3-chloro-4-hydroxyphenyl)propane, bis-(3,5-dimethyl-4-hydroxyphenyl)methane, 2,2-bis-(3,5-dimethyl-4- hydroxyphenyl)propane, bis-(3,5-dimethyl-4-hydroxyphenyl)sulfone, 2,4-bis-(3,5-dimethyl-4-hydroxyphenyl)-2-methylbutane, 1,1-bis-(3,5-dimethyl-4-hydroxyphenyl)-p-diisopropylbenzene, 2,2-bis-(3,5-dichloro-4-hydroxyphenyl)propane, 2,2-bis-(3,5-dibromo-4-hydroxyphenyl)propane and 1,1-bis-(4-hydroxyphenyl)-3,3,5-trimethylcyclohexane.

Particularly preferred diphenols are 2,2-bis-(4-hydroxyphenyl)propane, 2,2-bis-(3,5-dimethyl-4-hydroxyphenyl)propane, 2,2-bis-(3,5-dichloro-4-hydroxyphenyl)propane, 2,2-bis-(3,5-dibromo-4-hydroxyphenyl)propane, 1,1-bis-(4-hydroxyphenyl)cyclohexane and 1,1-bis-(4-hydroxyphenyl)-3,3,5-trimethylcyclohexane.

These and other suitable diphenols are described for example in U.S. Pat. No. 3,028,635, U.S. Pat. No. 2,999,825, U.S. Pat. No. 3,148,172, U.S. Pat. No. 2,991,273, U.S. Pat. No. 3,271,367, U.S. Pat. No. 4,982,014 and U.S. Pat. No. 2,999,846, in DE-A 1 570 703, DE-A 2 063 050, DE-A 2 036 052, DE-A 2 211 956 and DE-A 3 832 396, in FR-A 1 561 518, in the monograph "H. Schnell, Chemistry and Physics of Polycarbonates, Interscience Publishers, New York 1964" and in JP-A 62039/1986, JP-A 62040/1986 and JP-A 105550/1986.

In the case of homopolycarbonates only one diphenol is used, in the case of copolycarbonates several diphenols are used.

Suitable carbonic acid derivatives are for example phosgene or diphenyl carbonate.

Suitable chain terminators which can be used in the production of polycarbonates are both monophenols and monocarboxylic acids. Suitable monophenols are for example phenol itself, alkylphenols such as cresols, p-tert-butylphenol, cumylphenol, p-n-octylphenol, p-iso-octylphenol, p-n-nonylphenol and p-iso-nonylphenol, halophenols such as p-chlorophenol, 2,4-dichlorophenol, p-bromophenol and 2,4,6-tribromophenol, 2,4,6-triiodophenol, p-iodophenol, and mixtures thereof.

Preferred chain terminators are further the phenols which are mono- or polysubstituted with C1 to C30 alkyl radicals, linear or branched, preferably unsubstituted or substituted with tert-butyl. Particularly preferred chain terminators are phenol, cumylphenol and/or p-tert-butylphenol.

Suitable monocarboxylic acids are furthermore benzoic acid, alkylbenzoic acids and halobenzoic acids.

The amount of chain terminator to be used is preferably 0.1 to 5 mol %, relative to mols of diphenols used. The chain terminators can be added before, during or after the reaction with a carbonic acid derivative.

Suitable branching agents are the trifunctional or higher than trifunctional compounds known in polycarbonate chemistry, in particular those having three or more than three phenolic OH groups.

Suitable branching agents are for example phloroglucinol, 4,6-dimethyl-2,4,6-tri-(4-hydroxyphenyl)heptene-2,4,6-dimethyl-2,4,6-tri-(4-hydroxyphenyl)heptane, 1,3,5-tri-(4-hydroxyphenyl)benzene, 1,1,1-tri-(4-hydroxyphenyl)ethane, tri-(4-hydroxyphenyl)phenylmethane, 2,2-bis-[4,4-bis-(4-hydroxyphenyl)cyclohexyl]propane, 2,4-bis-(4-hydroxyphenyl isopropyl)phenol, 2,6-bis-(2-hydroxy-5'-methylbenzyl)-4-methylphenol, 2-(4-hydroxyphenyl)-2-(2,4-dihydroxyphenyl)propane, hexa-(4-(4-hydroxyphenyl isopropyl)phenyl)ortho-terephthalic acid ester, tetra-(4-hydroxyphenyl)methane, tetra-(4-(4-hydroxyphenyl isopropyl) phenoxy)methane and 1,4-bis-((4',4''-dihydroxytriphenyl) methyl)benzene as well as 2,4-dihydroxybenzoic acid, trimesic acid, cyanuric chloride and 3,3-bis-(3-methyl-4-hydroxyphenyl)-2-oxo-2,3-dihydroindole.

The amount of branching agents optionally to be used is preferably 0.05 mol % to 2.00 mol %, relative in turn to mols of diphenols used.

The branching agents can either be introduced into the aqueous alkaline phase with the diphenols and the chain terminators or be added prior to phosgenation dissolved in an organic solvent. If the interesterification process is used, the branching agents are used together with the diphenols.

The aromatic polycarbonates of the present invention have weight-average molecular weights Mw (determined by gel permeation chromatography and calibration with a polycarbonate standard) of between 5000 and 200,000 g/mol, preferably between 18,000 and 32,000 g/mol, more preferably between 20,000 and 31,000 g/mol, still more preferably between 20,000 and 26,000 g/mol, and particularly preferably between 22,000 and 26,000 g/mol.

Particularly preferred polycarbonates are the homopolycarbonate based on bisphenol A, the homopolycarbonate based on 1,3-bis-(4-hydroxyphenyl)-3,3,5-trimethylcyclohexane and the copolycarbonates based on the two monomers bisphenol A and 1,1-bis-(4-hydroxyphenyl)-3,3,5-trimethylcyclohexane.

Component b)

Suitable stabilisers within the meaning of the present invention are heat stabilisers selected from the groups of phosphates, phosphites, phosphonites and phosphines. Examples are triphenylphosphite, diphenylalkylphosphite, phenyldialkylphosphite, tris(nonylphenyl)phosphite, trilaurylphosphite, trioctadecylphosphite, distearylpentaerythritol diphosphite, tris(2,4-di-tert-butylphenyl)phosphite (Irgafos® 168), diisodecylpentaerythritol diphosphite, bis(2,4-di-tert-butylphenyl)pentaerythritol diphosphite, bis(2,6-di-tert-butyl-4-methylphenyl)pentaerythritol diphosphite, bis(2,4-dicumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearylsorbitol triphosphite, tetrakis(2,4-di-tert-butylphenyl)-4,4'-biphenylendiphosphonite, 6-isooctyloxy-2,4,8,10-tetra-tert-butyl-12H-dibenz[d,g]-1,3,2-dioxaphosphocine, bis(2,4-di-tert-butyl-6-methylphenyl)methylphosphite, bis(2,4-di-tert-butyl-6-methylphenyl)ethylphosphite, 6-fluoro-2,4,8,10-tetra-tert-butyl-12-methyl-dibenz[d,g]-1,3,2-dioxaphosphocine, 2,2',2''-nitrilo-[triethyltris(3,3',5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl)phosphite, bis(2,6-di-tert-butyl-4-methylphenyl)pentaerythritol diphosphite (PEP-36), 5-butyl-5-ethyl-2-(2,4,6-tri-tert-butylphenoxy)-1,3,2-dioxaphosphirane, triphenylphosphine (TPP), trialkylphenylphosphine, bisdiphenylphosphinoethane or a trinaphthylphosphine. Triphenylphosphine (TPP), Irgafos® 168 (tris(2,4-di-tert-butylphenyl)phosphite), PEP-(bis(2,6-di-tert-butyl-4-methylphenyl)pentaerythritol diphosphite) and tris(nonylphenyl)phosphite or mixtures thereof are particularly preferably used.

Phosphate stabilisers within the meaning of the present invention are for example phosphates of formula (I) or mixtures of these phosphates.

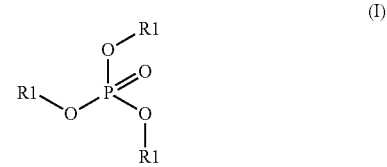

in which R1 mutually independently denotes branched alkyl radicals and/or optionally substituted aryl radicals, the alkyl radical preferably being a $C_1$-$C_{18}$ alkyl, more preferably a $C_1$-$C_8$ alkyl.

The aryl radical is preferably substituted with $C_1$-$C_8$ alkyl, branched $C_1$-$C_8$ alkyl, or cumyl, wherein the substituents can be identical or different, identical substituents being preferred, however.

The aryl radicals are preferably substituted in the 2- and 4-positions or in the 2-, 4- and 6-positions.

Most particularly preferably there are tert-butyl substituents in these positions.

All R1 are further preferably identical.

Antioxidants such as phenolic antioxidants, for example alkylated monophenols, alkylated thioalkyl phenols, hydroquinones and alkylated hydroquinones can also be used. Irganox® 1010 (pentaerythritol-3-(4-hydroxy-3,5-di-tert-butylphenyl)propionate; CAS: 6683-19-8) and Irganox 1076® (2,6-di-tert-butyl-4-(octadecanoxycarbonylethyl)phenol) are preferably used. Irganox 1076® (2,6-di-tert-butyl-4-(octadecanoxycarbonylethyl)phenol) is particularly preferably used.

In a special embodiment of the present invention the phosphine compounds according to the invention are used together with a phosphite or a phenolic antioxidant or a mixture of these last two compounds.

In a particularly preferred embodiment the stabiliser system consists of triphenylphosphine, a mixture of triphenylphosphine and a phenolic antioxidant such as Irganox 1076 or Irganox 1010 and/or a combination of phenolic antioxidant and phosphite, preferably a mixture of Irganox 1076 or Irganox 1010 and Irgafox 168 or PEP-36.

In a further preferred embodiment the stabiliser system consists of a phosphine, a phosphite and a phenolic antioxidant, for example triphenylphosphine, Irganox 1076 and Irgafox 168.

Component c)

The compositions according to the invention contain at least one dye selected from the group comprising structures (1a) and (1b).

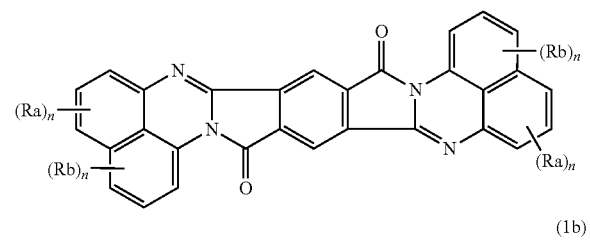

(1a)

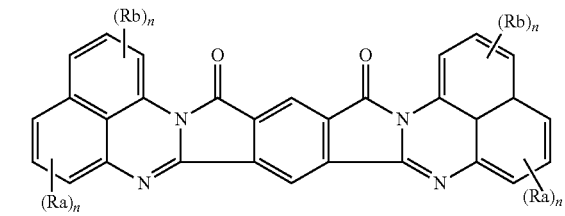

(1b)

in which

Ra and Rb independently of each other denote a linear or branched alkyl radical, or halogen, preferably methyl, ethyl, propyl, isopropyl, butyl, isobutyl, tert-butyl, pentyl, neopentyl, hexyl, thexyl or Cl, more preferably methyl, Cl and particularly preferably Cl n independently of each R denotes a natural number between 0 and 3, the radical being hydrogen in the case of n=0.

In a preferred embodiment Ra and/or Rb are Cl and are located in the o- and/or p-positions to the carbon atoms bearing the amine functionalities, such as for example di-orthochloronapthaleno, di-ortho, mono-para-chloronaphthaleno and mono-ortho-naphthaleno. Moreover in a preferred embodiment Ra and Rb each represent a tert-butyl radical, which is preferably located in the meta-position to the carbon atoms bearing the nitrogen functionalities.

In a particularly preferred embodiment n=0 in all rings, such that all Ra and Rb are H.

Component d)

The compositions according to the invention contain at least one dye from the group comprising dyes differing from structure 1a and/or 1b based on perinone or indanthrone and dyes based on a phthalocyanine or phthalocyanine complex, in particular dyes selected from the group comprising structures (2a), (2b), (3a), (3b) and (4)

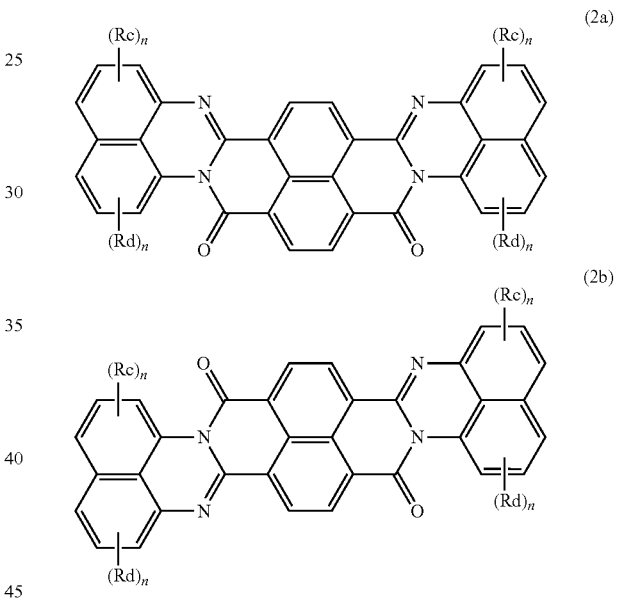

in which

Rc and Rd independently of each other denote a linear or branched alkyl radical, or halogen, preferably methyl, ethyl, propyl, isopropyl, butyl, isobutyl, tert-butyl, pentyl, neopentyl, hexyl, thexyl or Cl, more preferably methyl, Cl and particularly preferably Cl n independently of each R denotes a natural number between 0 and 3, the radical being hydrogen in the case of n=0.

In a preferred embodiment Rc and/or Rd are Cl and are located in the o- and/or p-positions to the carbon atoms bearing the amine functionalities, such as for example di-orthochloronapthaleno, di-ortho, mono-para-chloronaphthaleno and mono-ortho-naphthaleno. Moreover in a preferred embodiment Rc and Rd each represent a tert-butyl radical, which is preferably located in the meta-position to the carbon atoms bearing the nitrogen functionalities.

In a particularly preferred embodiment n=0 in all rings, such that all Rc and Rd are H.

Structures (1a) and (1b) and (2a) and (2b) relate isomerically to one another. The individual isomers can be used on their own or in a mixture. In one particular embodiment a 1:1 mixture of isomers (relative to the amount of isomer in the mixture of isomers in wt. %) of (1a) and (1b) or (2a) and (2b) is used.

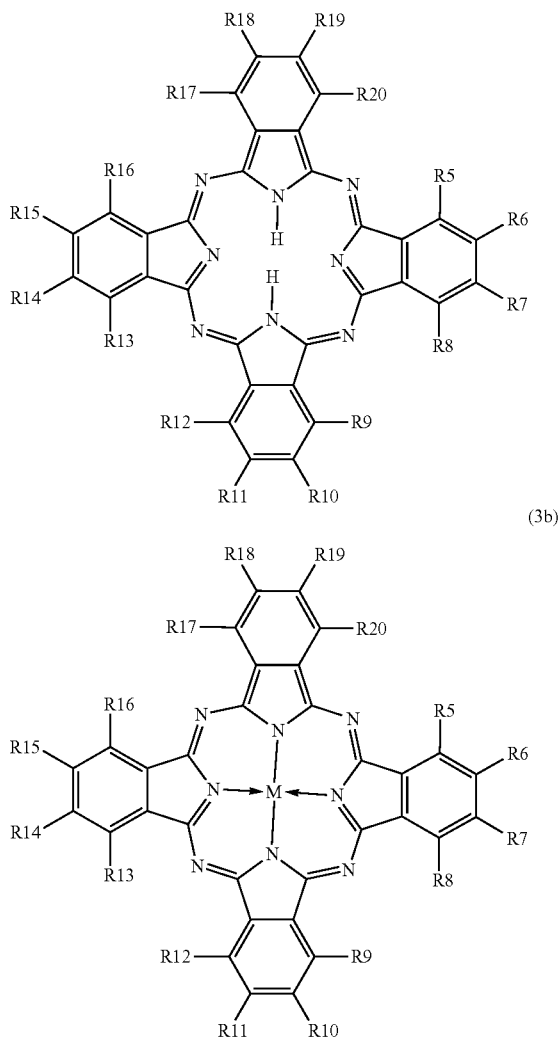

The radicals R(5-20) are in each case independently of one another hydrogen, methyl, ethyl, propyl, isopropyl, butyl, isobutyl, tert-butyl, pentyl, neopentyl, hexyl, thexyl, fluorine, chlorine, bromine, sulfone, CN.

R(5-20) is preferably identical in all positions. R(5-20) is further preferably H in all positions. In an alternative embodiment R(5-20) is Cl in all positions. M is preferably aluminium (with R=H: aluminium phthalocyanine, CAS: 14154-42-8), nickel (with R=H: nickel phthalocyanine, CAS: 14055-02-8), cobalt (with R=H: cobalt phthalocyanine, CAS: 3317-67-7), iron (with R=H: iron phthalocyanine, CAS: 132-16-1), zinc (with R=H: zinc phthalocyanine, CAS: 14320-04-08), copper (with R=H: copper phthalocyanine, CAS: 147-14-8; with R=H and Cl: polychloro copper phthalocyanine, CAS: 1328-53-6; with R=Cl: hexadecachlorophthalocyanine, CAS: 28888-81-5; with R=Br: hexadecabromophthalocyanine, CAS: 28746-04-5), manganese (with R=H: manganese phthalocyanine, CAS: 14325-24-7) and magnesium.

The combination of M=Cu and R=H for all positions is preferred in particular. A compound of structure (3b) with M=Cu and R(5-20)=H is available from BASF AG, Ludwigshafen as Heliogen® Blue K 6911D or Heliogen® Blue K 7104 KW.

Compounds of structure (3a) are available from BASF AG, Ludwigshafen as for example Heliogen®Blue L 7460.

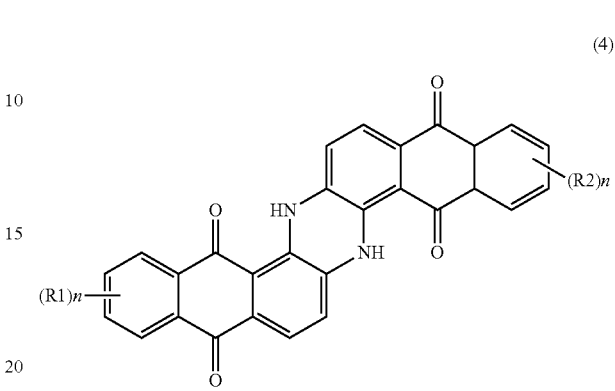

in which

R1 and R2 independently of each other denote a linear or branched alkyl radical, or halogen, preferably methyl, ethyl, propyl, isopropyl, butyl, isobutyl, tert-butyl, pentyl, neopentyl, hexyl, thexyl or Cl, more preferably methyl, Cl and particularly preferably Cl n denotes a natural number between 0 and 4.

In a particularly preferred embodiment n=0 in all rings, such that all R1 and R2 are H.

Dyes of this structure (4) are available commercially in the Paliogen Blue range from BASF AG.

If dyes of structure (4) are used, pigments are preferred in particular which have a bulk volume (determined in accordance with DIN ISO 787-11) of 2 l/kg to 10 l/kg, preferably 3 l/kg to 8 l/kg, a specific surface area (determined in accordance with DIN 66132) of 5 $m^2/g$ to 60 $m^2/g$, preferably 10 $m^2/g$ to 55 $m^2/g$, and a pH (determined in accordance with DIN EN 787-9) of 4 to 9.

The production of such dyes has been described for example in DE 2148101 or WO 2009/074504. It is known that these dyes are suitable for incorporation into plastics because of their high thermal stability. However, none of the documents describes the stability of these dyes in respect of LED light or the light stability of thermoplastic compositions containing these dyes.

In a further special embodiment the perinone-based dyes described in components c) and d) are used as pure isomers.

The substrates of the present invention can furthermore optionally contain release agents as component e) and/or UV absorbers as component f).

Particularly suitable release agents as component e) of the composition according to the invention are for example pentaerythritol tetrastearate (PETS) or glycerol monostearate (GMS). According to a special embodiment of the invention the overall composition contains release agents in a proportion of 0 ppm to 3000 ppm, preferably 100 ppm to 1000 ppm and more preferably 150 ppm to 500 ppm, relative to the mass of the overall composition.

The preferred special UV stabilisers as component 1) of the present invention are compounds which have as low a transmission as possible below 400 nm and as high a transmission as possible above 400 nm. Such compounds and the production thereof are known from the literature and are described for example in EP-A 0 839 623, WO-A 96/15102 and EP-A 0 500 496. Particularly suitable ultraviolet absorbers for use in the composition according to the invention are benzotriazoles, triazines, benzophenones and/or arylated cyanoacrylates.

Particularly suitable ultraviolet absorbers are hydroxy benzotriazoles, such as 2-(3',5'-bis-(1,1-dimethylbenzyl)-2'-hydroxyphenyl)benzotriazole (Tinuvin® 234, Ciba Spezialitätenchemie, Basel), 2-(2'-hydroxy-5'-(tert-octyl)phenyl) benzotriazole (Tinuvin® 329, Ciba Spezialitätenchemie, Basel), 2-(2'-hydroxy-3'-(2-butyl)-5'-(tert-butyl)phenyl)benzotriazole (Tinuvin® 350, Ciba Spezialitätenchemie, Basel), bis-(3-(2H-benzotriazolyl)-2-hydroxy-5-tert-octyl)methane, (Tinuvin® 360, Ciba Spezialitätenchemie, Basel), (2-(4,6-diphenyl-1,3,5-triazin-2-yl)-5-(hexyloxy)phenol (Tinuvin® 1577, Ciba Spezialitätenchemie, Basel), and the benzophenones 2,4-dihydroxybenzophenone (Chimassorb® 22, Ciba Spezialitätenchemie, Basel) and 2-hydroxy-4-(octyloxy) benzophenone (Chimassorb® 81, Ciba, Basel), 2-propenoic acid, 2-cyano-3,3-diphenyl-, 2,2-bis[[(2-cyano-1-oxo-3,3-diphenyl-2-propenyl)oxy]methyl]-1,3-propanediyl ester (9CI) (Uvinul® 3030, BASF AG Ludwigshafen), 2-[2-hydroxy-4-(2-ethylhexyl)oxy]phenyl-4,6-di(4-phenyl)phenyl-1,3,5-triazine (CGX UVA 006, Ciba Spezialitätenchemie, Basel) or tetraethyl-2,2'-(1,4-phenylene dimethylidene)bis-malonate (Hostavin® B-Cap, Clariant AG).

Particularly preferred special UV stabilisers are for example Tinuvin® 360, Tinuvin® 350, Tinuvin® 329, Hostavin® B-CAP, particularly preferably TIN 329 and Hostavin® B-Cap.

Mixtures of these ultraviolet absorbers can also be used.

There are no specific limitations regarding the amount of ultraviolet absorber contained in the composition, provided that the desired absorption of UV radiation and an adequate transparency of the moulding produced from the composition are ensured. According to a special embodiment of the invention the composition contains ultraviolet absorbers in an amount from 0 ppm to 6000 ppm, preferably 500 ppm to 5000 ppm and more preferably 1000 ppm to 2000 ppm, relative to the overall composition.

In addition to the stabilisers according to the invention the polymer compositions according to the invention can optionally also contain further conventional polymer additives as component g), such as the antioxidants, flame retardants, stabilisers differing from b), optical brighteners, light scattering agents and fillers and reinforcing agents described for example in EP-A 0 839 623, WO-A 96/15102, EP-A 0 500 496 or "Plastics Additives Handbook", Hans Zweifel, 5th Edition 2000, Hanser Verlag, Munich, in the conventional amounts for the individual thermoplastics.

The further polymer additives g) are preferably used in amounts from 0 ppm to 500,000 ppm, preferably 100 ppm to 100,000 ppm and more preferably 500 ppm to 50,000 ppm, relative in each case to the amount of the overall polymer compositions. Mixtures of a plurality of additives are also suitable.

The moulding composition according to the invention can be processed into special mouldings with the function of optical components such as optical fibres, lenses, covers, which are suitable in particular for use in combination with LED light.

The preferred injection moulding method with which the plastic moulding is produced has the advantage of a high degree of freedom in the shaping of the optical component. The plastic article can if desired have a shallow depth, which is advantageous for flat applications. The possibility of inserting electronic components (e.g. an LED) directly into recesses in the moulding has various advantages. The electronic component can be precisely positioned on the plastic moulding in this way.

A recess in the optical component can be designed in such a way that the top of the electronic components is almost flush with the top of the moulding. This configuration has the advantage that an electrical contact between the electronic components and further components and/or electrical conductors can be established in an advantageous manner.

The light transmission of a colour-corrected transparent substrate material within the meaning of this invention should be at least 80%, preferably at least 85%, more preferably at least 88%, particularly preferably at least 89% (measured in accordance with ISO 13468-2 with a 4-mm-thick specimen).

In the case of strongly coloured materials within the meaning of this invention the transmission can also be less than 80%, measured in accordance with the parameters described above, with high concentrations of components c and d.

Methods for producing the polymer compositions according to the invention are known in principle to the person skilled in the art.

The polymer compositions according to the invention containing components a) to g) are produced using common incorporation methods by combining, mixing and homogenising the individual constituents, wherein homogenisation in particular preferably takes place in the melt under the action of shear forces. Combining and mixing optionally takes place prior to melt homogenisation, using pre-mixed powders.

Pre-mixes consisting of granules or granules and powders with the additives according to the invention can also be used.

Pre-mixes produced from solutions of the mixture components in suitable solvents can also be used, wherein homogenisation optionally takes place in solution and then the solvent is removed.

The additives can in particular be incorporated into the composition according to the invention by known means or as a masterbatch.

The use of masterbatches is preferred in particular for incorporating the dyes, wherein masterbatches based on the individual polymer matrix are used in particular.

In this connection the composition can be mixed and homogenised in conventional devices such as extruders (for example twin-screw extruders), compounders, Brabender or Banbury mills, and then extruded. Following extrusion the extrudate can be cooled and shredded. Individual components can also be pre-mixed and then the remaining starting materials added individually and/or likewise in a mixture.

Combining and thorough mixing of a pre-mix in the melt can also take place in the plasticising unit of an injection moulding machine. Here the melt is converted directly into a moulding in the subsequent step.

In a particular embodiment the dye mixture according to the invention is optionally mixed with further additives to form a masterbatch prior to incorporation into the thermoplastic polymer matrix, mixing preferably taking place in the melt under the action of shear forces (for example in a compounder or a twin-screw extruder). This method offers the advantage that the dyes can be distributed better in the polymer matrix. The thermoplastic which is also the main component of the ultimate overall polymer composition is preferably used as the polymer matrix for production of the masterbatch.

The plastic mouldings can preferably be produced by injection moulding.

The surface of the transparent or translucent plastic mouldings can additionally include structures having an optical effect, for example microlenses, for additional direction of the light.

As an alternative to the aforementioned plastic moulding with microlenses for focusing and increased efficiency, a plastic moulding (plastic film) can also be provided with diffuser properties to create the impression of a flat light rather than a light with point light sources.

If phosphorescent pigments (known as phosphors) are incorporated into or applied to this plastic moulding or this plastic film, white light for example can be produced if blue LEDs are used. Different effects can thus be achieved through the use of phosphors.

The moulding compositions according to the invention can be used in a diverse range of moulded components. These components can be used in all sorts of applications, those application areas which are exposed to light from high-power LEDs being preferred.

Moulded objects are for example and preferably translucent objects such as for example and preferably covers and lenses for lights in motor vehicles or other lighting applications, lenses such as for example spectacle lenses, films, film tapes, sheets, ribbed sheets, multi-wall sheets, vessels, pipes and other profiles produced by the conventional methods, such as for example hot press moulding, spinning, extrusion or injection moulding. The polymer compositions can also be processed into cast films.

Possible applications or fields of application of the plastic compositions according to the invention are furthermore:

1. Lenses for focusing and distributing the light in accordance with requirements, and optical fibres
2. Translucent sheets, in particular twin-wall sheets, for example as glazing for buildings such as railway stations, greenhouses and lighting installations
3. Lights, e.g. headlight covers, indicator covers or other optical elements in headlights
4. Lights for residential and office building interiors and lights for external use such as streetlights
5. Illuminating devices in flat-screen televisions
6. Illuminating devices for displays of electronic devices such as e.g. calculators, mobile phones
7. Safety glazing systems such as are required in buildings, motor vehicles and aircraft
8. Visors and spectacles and helmet visors in a wide range of shades
9. Extruded and solution films for displays or electric motors, also ski films
10. Blow mouldings
11. Traffic light housings, traffic light covers, traffic light lenses or road signs
12. Medical applications
13. Components of household goods, electrical and electronic devices
14. Automotive parts, such as glazing systems, instrument panels, body parts and trim The use of the plastic composition according to the invention to produce multilayer systems is also of interest. Here the plastic composition according to the invention is applied in one or more layers to a moulded object made from a non-coloured or differently coloured plastic. Said plastic composition can be applied at the same time as or immediately after moulding of the moulded item, for example by back moulding of a film, coextrusion or sandwich injection moulding. It can however also be applied to the ready-moulded base component, for example by lamination with a film, encapsulation of an existing moulding or by coating from a solution.

The moulding compositions according to the invention are particularly suitable for transparent colour-neutral or slightly blued formulations of thermoplastics, but they can also be differently coloured and intensively coloured moulding compositions.

The plastic compositions according to the invention can also be obtained by means of masterbatches in which the desired additive composition is already completely or partly pre-mixed. According to the desired composition of the plastic, corresponding amounts of this masterbatch are then simply added to the polycarbonate, for example during compounding or prior to extrusion.

The colour in transmission was determined using a Lambda 900 spectral photometer from Perkin Elmer with a photometer sphere by reference to ASTM E1348, with the weighting factors and formulae described in ASTM E308.

Light Transmission (Ty):

The transmission measurements were carried out using a Lambda 900 spectral photometer from Perkin Elmer with a photometer sphere in accordance with ISO 13468-2 (i.e. overall transmission determined by measuring the diffuse transmission and direct transmission).

The colour in transmission was determined using a Lambda 900 spectral photometer from Perkin Elmer with a photometer sphere by reference to ASTM E1348, with the weighting factors and formulae described in ASTM E308.

The CIELAB colour coordinates L*, a*, b* were calculated for light type D 65 and a 10° standard observer.

Visual Light Transmission:

The transmission measurements were carried out using a Lambda 900 spectral photometer from Perkin Elmer with a photometer sphere (i.e. overall transmission determined by measuring both the diffuse and direct transmission).

The yellowness index (YI) was calculated from the data thus obtained in accordance with ASTM E313.

The invention will now be described in further detail with reference to the following non-limiting examples.

Examples

A linear BPA polycarbonate with an MVR of 17 $cm^3/10$ min (measured in accordance with ISO 1133 at 250° C. and 2.16 kg) or 61 $cm^3/10$ min (measured in accordance with ISO 1133 at 300° C. and 1.2 kg) was used as the base polymer.

The following dyes were used:

A blend of dyes [1] corresponding to the structures 1a/1b with n=0 at all rings, i.e. all Ra and Rb=H, in which components 1a and 1b (with the substitution pattern described) are present in the ratio (percent by weight) of 1:1. By virtue of its absorption characteristic this dye blend serves as the violet component. The production of this dye blend is described separately below.

A blend of dyes [2] corresponding to the structures 2a/2b with n=0 at all rings, i.e. all Rc and Rd=H, in which components 2a and 2b (with the substitution pattern described) are present in the ratio (percent by weight) of 1:1. By virtue of its absorption characteristic this dye blend serves as the blue component. The production of this dye blend is also described separately below.

A dye [3] corresponding to the structure 3b with M=Cu and R5-R20=H, also known under the colour index name Pigment Blue 15:3 and obtainable for example from BASF AG under the name Heliogen® Blau K 7090.

A dye [4] corresponding to the structure 4 with R1 and R241, also known under the colour index name Pigment Blue 60 and obtainable for example from BASF AG under the name Paliogen Blau L 6470.

The anthraquinone-based dyes Macrolex® Violett 3R (colour index Solvent Violet 36) and Macrolex® Blau RR (colour index Solvent Blue 97) from Lanxess commonly used for polycarbonates were used as comparative systems.

The compositions of the samples are shown in Table 1; with the specified dye contents the samples consist of sufficient matrix polymer to give an overall composition of 100%.

To assess the stability of the individual dye systems samples 1 to 6 and comparative samples A and B were prepared by the method described above. As the samples were prepared in two separate groups (group 1: samples 1 to 3 and comparative sample A; group 2: samples 4 to 6 and comparative sample B), the experiments contain two blank samples (A and B by analogy to the comparative samples). These blank samples contain only the matrix polymer and no dye, but are otherwise subjected to all the same processing steps as the other samples.

TABLE 1

Composition of samples for determining the stability of the dyes

| Sample | Violet component | Content of violet component [ppm] | Blue component | Content of blue component [ppm] |
|---|---|---|---|---|
| Comparative sample A | Macrolex® Violett 3R | 3.00 | Macrolex® Blau RR | 2.00 |
| Sample 1 | [1] | 2.40 | [2] | 2.00 |
| Sample 2 | [1] | 4.50 | [3] | 1.00 |
| Sample 3 | [1] | 2.25 | [4] | 2.00 |
| Comparative sample B | Macrolex® Violett 3R | 0.60 | Macrolex® Blau RR | 0.40 |
| Sample 4 | [1] | 0.48 | [2] | 0.40 |
| Sample 5 | [1] | 0.90 | [3] | 0.20 |
| Sample 6 | [1] | 0.45 | [4] | 0.40 |
| Blank samples A and B | — | — | — | — |

Production of Substances of Components [1] and [2]

Structures of formula (1a) and (1b) (=[1]) and (2a) and (2b) (=[2]) were used inter alia in the examples according to the invention. These dyes were produced by reference to DE 2148101 as follows:

Production of [1]

5.62 g (0.025 mol) of benzene-1,2,4,5-tetracarboxylic acid dianhydride and 7.99 g (0.05 mol) of 1,8-diaminonaphthalene are placed in 75 ml of n-ethylpyrrolidone at room temperature and slowly heated to 150° C. The mixture is stirred at this temperature for 5 hours. After cooling, 125 ml of water are added and the precipitate formed is filtered off. The precipitate is then suspended repeatedly in water and washed in this way. The precipitate is dried under high vacuum at 80° C. A mixture of 50 ml of glacial acetic acid and 25 ml of acetic anhydride is added to the dried precipitate. The mixture is refluxed for 4 hours. After cooling, the reaction mixture is poured into 500 ml of water. The precipitate is filtered off, washed with water and dried under high vacuum at 80° C. 12.5 g of a lilac-coloured powder are obtained.

Production of [2]

6.71 g (0.025 mol) of naphthalene-1,4,5,8-tetracarboxylic acid dianhydride and 7.99 g (0.05 mol) of 1,8-diaminonaphthalene are placed in 75 ml of m-ethylpyrrolidone at room temperature and slowly heated to 150° C. The mixture is stirred at this temperature for 5 hours. After cooling, 152 ml of water are added and the precipitate formed is filtered off. The precipitate is then suspended repeatedly in water and washed in this way. The precipitate is dried under high vacuum at 80° C. A mixture of 50 ml of glacial acetic acid and 25 ml of acetic anhydride is added to the dried precipitate. The mixture is refluxed for 4 hours. After cooling, the reaction mixture is poured into 125 ml of water. The precipitate is filtered off, washed with hot water and dried under high vacuum at 80° C. 13.7 g of a lilac-coloured powder are obtained.

The contents specified in Table 1 were produced by an incremental dilution of polymer/dye mixtures.

To this end masterbatches containing 10 ppm of dye were produced, which where necessary were subjected to a further dilution step with basic polymer in a ratio of masterbatch to polymer of 1:9. Starting from the appropriate masterbatches, the target contents specified in Table 1 were then established by mixing violet and blue component masterbatches with optionally further base material.

Using electrostatic interactions, thorough mixing of both the masterbatches and the target samples is achieved by mixing the granules and dyes in a closed PE bag on a drum hoop mixer.

Specimens measuring 60×40×4 mm were produced from the polymer compositions obtained in this way. This was done by injection moulding; the subsequent homogenisation of the mixture took place in the plasticising unit of the injection moulding machine.

An Arburg Allrounder 370-800-150 with a screw diameter of 25 mm was used to produce the specimens and homogenise the polymer compositions. Processing took place at a melt temperature of 300° C. and a die temperature of 80° C. with a single residence time and a cycle time of 43.0 seconds.

The target contents of dye in the final composition were not checked separately. The presence of the dyes is demonstrated by means of the measured transmission spectra. The precise starting content of the dyes is not important for checking the relative dye stabilities, as the relative change is assessed.

The stabilities in respect of LED light were assessed by considering the changes in the optical properties of the specimens before and after exposure to LED light.

The wavelength-resolved transmission spectra were recorded as described above, wherein the beam path of the measuring device and the position of the sample were defined by means of a holder and template such that only the points exposed to light in the subsequent LED exposure were measured reproducibly.

The exposure to LED light took place in specially manufactured units. The LED models in the individual test units are described below. The other test conditions are described by the controlled sample temperature, measurement of the radiometric power density (irradiance) at the sample surface, the operating conditions (current feed) of the LED modules and the distance between the sample and the radiation-emitting LED.

The distance between the sample and the LED is 1 mm in all light exposure units. The samples are kept at a constant temperature of 120° C. The LEDs used are operated with an operating current of 0.7 amps.

Unit A uses white LEDs with a local maximum (in the radiation distribution between 360 nm and 480 nm) at 465 nm. Such LEDs are obtainable for example from Osram under the name LEW E3A. The irradiance at the sample surface is 22.4 W/cm$^2$.

Unit B uses blue LEDs with a local maximum (in the radiation distribution between 360 nm and 480 nm) at 465 nm. Such LEDs correspond to the aforementioned product LEW E3A from Osram without the subsequently applied phosphorescent dye to produce the white light impression. The irradiance at the sample surface is 22.4 W/cm$^2$.

Unit C uses white LEDs with a local maximum (in the radiation distribution between 360 nm and 480 nm) at 455 nm. Such LEDs are obtainable for example from Avago under the name ASMT-JW31-NPQK1. The irradiance at the sample surface is 55.1 W/cm².

Unit D uses blue LEDs with a local maximum (in the radiation distribution between 360 nm and 480 nm) at 455 nm. Such LEDs are obtainable for example from Avago under the name ASMT-JL31-NPQ01. The irradiance at the sample surface is 55.1 W/cm².

Exposure to LED light in the units described above and under the conditions described above took place in each case for 750 h.

In parallel, the samples used were stored at high temperature to determine the influence on the samples of the prevailing temperature during exposure to light. This high-temperature storage took place in an analogous manner to the light exposure experiments for 750 h at 120° C.; the optical properties were measured under identical conditions.

According to the methods described above, wavelength-resolved transmission spectra were recorded for the samples at the start of and after exposure to light.

For the relatively strongly coloured samples 1 to 3 and comparative sample A and the associated blank sample A the stabilities of the dyes used can be assessed by means of the Beer-Lambert law.

From the data for the wavelength-resolved transmission spectra the characteristics absorptions of the dyes used are determined from the position of the local absorption maxima (see Table 2).

TABLE 2

Position of the characteristic absorption bands of the dyes used

| Char. band [nm] | [1] | [2] | [3] | [4] | Macrolex ® Violett 3R | Macrolex ® Blau RR |
|---|---|---|---|---|---|---|
| A | 540 | 665 | 675 | 675 | 545 | 635 |
| B | 590 | | | 740 | 580 | |

For samples 1 to 3 and comparative sample A and the associated blank sample A used as a reference, the following light transmission values are measured for the characteristic wavelengths:

TABLE 3

Wavelength-resolved transmission of samples 1 to 3 and A before and after high-temperature storage

| | High-temperature storage transmission | | | | | | | | | |
|---|---|---|---|---|---|---|---|---|---|---|
| | Comparative sample A | | Sample 1 | | Sample 2 | | Sample 3 | | Blank sample A | |
| Char. wavelength [nm] | 0 h | 750 h | 0 h | 750 h | 0 h | 750 h | 0 h | 750 h | 0 h | 750 h |
| 540 | — | — | 76.67 | 76.70 | 73.79 | 73.55 | 81.08 | 80.77 | 90.21 | 89.76 |
| 545 | 79.35 | 79.53 | — | — | — | — | — | — | 90.14 | 89.94 |
| 580 | 77.60 | 77.86 | — | — | — | — | — | — | 90.38 | 90.30 |
| 590 | — | — | 76.87 | 77.24 | 76.64 | 76.75 | 81.87 | 82.23 | 90.14 | 90.42 |
| 635 | 82.50 | 82.91 | — | — | — | — | — | — | 90.57 | 90.57 |
| 665 | — | — | 84.59 | 84.64 | — | — | — | — | 90.50 | 90.69 |
| 675 | — | — | — | — | 62.23 | 62.47 | 81.48 | 82.09 | 90.47 | 90.72 |
| 740 | — | — | — | — | — | — | 80.49 | 81.32 | 90.26 | 90.63 |

TABLE 4

Wavelength-resolved transmission of samples 1 to 3 and A before and after exposure to light in unit A

| | Unit A: transmission | | | | | | | | | |
|---|---|---|---|---|---|---|---|---|---|---|
| | Comparative sample A | | Sample 1 | | Sample 2 | | Sample 3 | | Blank sample A | |
| Char. wavelength [nm] | 0 h | 750 h | 0 h | 750 h | 0 h | 750 h | 0 h | 750 h | 0 h | 750 h |
| 540 | — | — | 76.82 | 80.71 | 73.72 | 77.81 | 80.99 | 83.20 | 89.51 | 89.65 |
| 545 | 79.06 | 88.43 | — | — | — | — | — | — | 89.55 | 89.69 |
| 580 | 77.21 | 88.69 | — | — | — | — | — | — | 89.91 | 89.85 |
| 590 | — | — | 77.04 | 82.54 | 76.56 | 80.73 | 82.02 | 84.57 | 89.67 | 89.96 |
| 635 | 82.16 | 89.50 | — | — | — | — | — | — | 90.15 | 90.03 |
| 665 | — | — | 84.30 | 88.00 | — | — | — | — | 89.99 | 89.93 |
| 675 | — | — | — | — | 62.43 | 67.35 | 81.38 | 84.84 | 90.11 | 90.30 |
| 740 | — | — | — | — | — | — | 80.94 | 84.35 | 90.02 | 90.10 |

TABLE 5

Wavelength-resolved transmission of samples 1 to 3 and A before and after exposure to light in unit B

| | Unit B: Transmission | | | | | | | | | |
|---|---|---|---|---|---|---|---|---|---|---|
| Char. wavelength | Comparative sample A | | Sample 1 | | Sample 2 | | Sample 3 | | Blank sample A | |
| [nm] | 0 h | 750 h | 0 h | 750 h | 0 h | 750 h | 0 h | 750 h | 0 h | 750 h |
| 540 | — | — | 76.55 | 79.63 | 73.70 | 76.81 | 80.95 | 82.55 | 89.51 | 89.63 |
| 545 | 79.33 | 87.15 | — | — | — | — | — | — | 89.63 | 89.89 |
| 580 | 77.24 | 85.99 | — | — | — | — | — | — | 89.57 | 89.84 |
| 590 | — | — | 76.76 | 80.71 | 76.72 | 79.60 | 81.82 | 83.70 | 89.79 | 90.08 |
| 635 | 82.32 | 86.50 | — | — | — | — | — | — | 90.01 | 90.01 |
| 665 | — | — | 84.11 | 86.39 | — | — | — | — | 89.89 | 89.86 |
| 675 | — | — | — | — | 62.01 | 65.02 | 81.41 | 83.14 | 89.80 | 90.14 |
| 740 | — | — | — | — | — | — | 80.98 | 82.90 | 90.15 | 90.01 |

TABLE 6

Wavelength-resolved transmission of samples 1 to 3 and A before and after exposure to light in unit C

| | Unit C: Transmission | | | | | | | | | |
|---|---|---|---|---|---|---|---|---|---|---|
| Char. wavelength | Comparative sample A | | Sample 1 | | Sample 2 | | Sample 3 | | Blank sample A | |
| [nm] | 0 h | 750 h | 0 h | 750 h | 0 h | 750 h | 0 h | 750 h | 0 h | 750 h |
| 540 | — | — | 76.42 | 78.11 | 73.09 | 74.89 | 80.60 | 81.77 | 89.68 | 90.12 |
| 545 | 78.86 | 86.94 | — | — | — | — | — | — | 89.70 | 90.20 |
| 580 | 77.09 | 86.61 | — | — | — | — | — | — | 89.82 | 90.15 |
| 590 | — | — | 76.48 | 79.26 | 76.06 | 77.90 | 81.39 | 82.72 | 89.75 | 90.18 |
| 635 | 82.02 | 87.75 | — | — | — | — | — | — | 90.13 | 90.30 |
| 665 | — | — | 83.77 | 86.24 | — | — | — | — | 90.03 | 90.30 |
| 675 | — | — | — | — | 61.49 | 63.62 | 81.22 | 82.88 | 89.86 | 90.41 |
| 740 | — | — | — | — | — | — | 80.78 | 82.56 | 90.26 | 90.39 |

TABLE 7

Wavelength-resolved transmission of samples 1 to 3 and A before and after exposure to light in unit D

| | Unit D: Transmission | | | | | | | | | |
|---|---|---|---|---|---|---|---|---|---|---|
| Char. wavelength | Comparative sample A | | Sample 1 | | Sample 2 | | Sample 3 | | Blank sample A | |
| [nm] | 0 h | 750 h | 0 h | 750 h | 0 h | 750 h | 0 h | 750 h | 0 h | 750 h |
| 540 | — | — | 76.45 | 77.67 | 73.06 | 74.62 | 80.72 | 81.69 | 89.82 | 90.44 |
| 545 | 79.13 | 84.83 | — | — | — | — | — | — | 89.86 | 90.35 |
| 580 | 76.92 | 83.41 | — | — | — | — | — | — | 89.82 | 90.35 |
| 590 | — | — | 76.68 | 78.22 | 75.99 | 77.36 | 81.59 | 82.85 | 89.89 | 90.64 |
| 635 | 82.12 | 84.76 | — | — | — | — | — | — | 90.11 | 90.61 |
| 665 | — | — | 83.87 | 85.15 | — | — | — | — | 90.15 | 90.58 |
| 675 | — | — | — | — | 61.13 | 63.00 | 81.56 | 82.70 | 90.05 | 90.47 |
| 740 | — | — | — | — | — | — | 80.90 | 82.43 | 90.40 | 90.73 |

In the sample measurements the absorption of the dyes and the absorption of the base material are superimposed. By considering the difference spectrum for the dyed sample and the blank sample (undyed), the absorption of the dye alone can be determined.

For the absorption of the dye at the characteristic wavelength λ (extinction $E_\lambda$), the following applies:

$$E_\lambda = -lg\left(\frac{I_1}{I_0}\right) = \varepsilon_\lambda \cdot c \cdot d$$

So for concentration c:

$$c = -lg\left(\frac{I_1}{I_0}\right) \cdot \frac{1}{\varepsilon_\lambda} \cdot \frac{1}{d}$$

For the required assessment of the relative stability of the dyes during exposure to LED light it is possible to consider the relative change in concentration of the dye. This gives the ratio of the concentration of dye at the end of exposure ($c_{750h}$) to the concentration at the start of exposure ($c_{0h}$) as follows:

$$\frac{c_{750h}}{c_{0h}} = \frac{-lg\left(\frac{I_1}{I_0}\right)_{750h}}{-lg\left(\frac{I_1}{I_0}\right)_{0h}} \cdot \frac{\varepsilon_\lambda}{\varepsilon_\lambda} \cdot \frac{d}{d}$$

As the extinction coefficient $\epsilon_\lambda$ as a material constant and the thickness d are constant, because the same sample is measured before and after exposure to light, these factors can be removed from the equation. For the wavelength λ the measurement of the wavelength-resolved transmission spectra gives the proportion of light passing through the sample relative to the irradiated light and hence the term $$\frac{I_1}{I_0} \: (= transmission_\lambda)$$

required in the equation.

Under these assumptions the percentage degradation of the dyes under exposure to light can easily be determined from the available data (Table 8).

According to the Beer-Lambert calculations described above, the following percentage residual contents are obtained for the dyes used after exposure to light for 750 h or after high-temperature storage as a reference:

TABLE 8

Percentage residual contents of the dyes after 750 h (for [1] the mean of samples 1 to 3 is given)

| Unit | [1] | [2] | [3] | [4] | Macrolex ® Violett 3R | Macrolex ® Blau RR |
|---|---|---|---|---|---|---|
| (Temperature) | 98% | 102% | 100% | 95% | 97% | 95% |
| A | 69% | 33% | 80% | 62% | 10% | 6% |
| B | 78% | 59% | 89% | 80% | 28% | 45% |
| C | 89% | 64% | 93% | 84% | 28% | 31% |
| D | 94% | 86% | 94% | 89% | 51% | 72% |
| Mean A-D | 83% | 61% | 89% | 79% | 29% | 39% |

The calculated percentage residual contents for the high-temperature storage can be used to estimate the margin of error for the method: as an increase in the dye content is not possible, but calculated contents of 102% are obtained, an error of approx. ±2% (absolute) can be assumed.

The calculated residual dye contents in the samples set out in Table 8 clearly show that the stability of dyes [1], [2], [3] and [4] according to the invention is far superior to that of the comparative dyes. The residual values averaged over all exposure experiments are 83% for the violet component [1] according to the invention, corresponding to an average degradation during the exposures of 17% as compared with a degradation of 71% in the comparative system Macrolex® Violett 3R under identical conditions. Analogous results are found with blue components [2], [3] and [4] according to the invention with an average degradation of between 39% (61% residual content [2]) and 11% (89% residual content [3]) as compared with a degradation of 61% in the comparative component Macrolex® Blau RR. Even taking the aforementioned margin of error into consideration, this is a markedly increased stability of the dyes according to the invention under exposure to LED light as compared with the anthraquinone-based comparative systems.

For the more weakly coloured samples 4 to 6 and blank and comparative samples B it is not possible to evaluate the changes during exposure to light using the procedure described above for samples 1 to 3 and blank and comparative samples A, as the low contents of dyes do not show an adequate effect in the wavelength-resolved transmission spectrum. As they are the same dyes, however, a comparable result is likely, as the stability under LED light is dependent not on the concentrations but on the nature of the dyes. The same effects are recognised when considering the optical parameters yellowness index YI and transmission Ty (determined by the methods described above) and their change during the exposure experiments.

TABLE 9

Optical properties of samples 4 to 6 and "B" before and after high-temperature storage

| | High-temperature storage | | | | | | | | | |
|---|---|---|---|---|---|---|---|---|---|---|
| | Comparative sample B | | Sample 4 | | Sample 5 | | Sample 6 | | Blank sample B | |
| Optical parameters | 0 h | 750 h | 0 h | 750 h | 0 h | 750 h | 0 h | 750 h | 0 h | 750 h |
| YI | −0.51 | 1.01 | −0.16 | 0.57 | 0.07 | 0.34 | 0.09 | 0.39 | 1.22 | 1.19 |
| Delta YI | — | +1.52 | — | +0.73 | — | +0.27 | — | +0.30 | — | −0.03 |

TABLE 9-continued

Optical properties of samples 4 to 6 and "B" before and after high-temperature storage

| | High-temperature storage | | | | | | | | | |
|---|---|---|---|---|---|---|---|---|---|---|
| | Comparative sample B | | Sample 4 | | Sample 5 | | Sample 6 | | Blank sample B | |
| Optical parameters | 0 h | 750 h | 0 h | 750 h | 0 h | 750 h | 0 h | 750 h | 0 h | 750 h |
| Ty [%] | 88.13 | 89.49 | 87.39 | 88.08 | 87.41 | 87.96 | 88.53 | 88.78 | 89.98 | 90.64 |
| Delta Ty [%] | — | +1.36 | — | +0.69 | — | +0.55 | — | +0.25 | — | +0.66 |

TABLE 10

Optical properties of samples 4 to 6 and "B" before and after exposure to light in unit A

| | Unit A | | | | | | | | | |
|---|---|---|---|---|---|---|---|---|---|---|
| | Comparative sample B | | Sample 4 | | Sample 5 | | Sample 6 | | Blank sample B | |
| Optical parameters | 0 h | 750 h | 0 h | 750 h | 0 h | 750 h | 0 h | 750 h | 0 h | 750 h |
| YI | −0.47 | 1.08 | −0.20 | 1.02 | 0.04 | 0.95 | 0.33 | 0.98 | 1.12 | 1.24 |
| Delta YI | — | +1.55 | — | +1.22 | — | +0.91 | — | +0.65 | — | +0.12 |
| Ty [%] | 88.13 | 90.08 | 87.31 | 88.54 | 87.40 | 87.59 | 88.49 | 88.08 | 90.24 | 89.85 |
| Delta Ty [%] | — | +1.95 | — | +1.23 | — | +0.19 | — | −0.41 | — | −0.39 |

TABLE 11

Optical properties of samples 4 to 6 and "B" before and after exposure to light in unit B

| | Unit B | | | | | | | | | |
|---|---|---|---|---|---|---|---|---|---|---|
| | Comparative sample B | | Sample 4 | | Sample 5 | | Sample 6 | | Blank sample B | |
| Optical parameters | 0 h | 750 h | 0 h | 750 h | 0 h | 750 h | 0 h | 750 h | 0 h | 750 h |
| YI | −0.42 | 0.63 | −0.17 | 0.43 | 0.25 | 0.52 | 0.40 | 0.57 | 1.13 | 1.18 |
| Delta YI | — | +1.05 | — | +0.60 | — | +0.27 | — | +0.17 | — | +0.05 |
| Ty [%] | 88.14 | 89.22 | 87.59 | 87.85 | 87.42 | 87.35 | 88.39 | 88.24 | 90.13 | 90.16 |
| Delta Ty [%] | — | +1.08 | — | +0.26 | — | −0.07 | — | −0.15 | — | +0.03 |

TABLE 12

Optical properties of samples 4 to 6 and "B" before and after exposure to light in unit C

| | Unit C | | | | | | | | | |
|---|---|---|---|---|---|---|---|---|---|---|
| | Comparative sample B | | Sample 4 | | Sample 5 | | Sample 6 | | Blank sample B | |
| Optical parameters | 0 h | 750 h | 0 h | 750 h | 0 h | 750 h | 0 h | 750 h | 0 h | 750 h |
| YI | −0.51 | 1.01 | −0.16 | 0.57 | 0.07 | 0.34 | 0.09 | 0.39 | 1.22 | 1.19 |
| Delta YI | — | +1.52 | — | +0.73 | — | +0.27 | — | +0.30 | — | −0.03 |
| Ty [%] | 88.13 | 89.49 | 87.39 | 88.08 | 87.41 | 87.96 | 88.53 | 88.78 | 89.98 | 90.64 |
| Delta Ty [%] | — | +1.36 | — | +0.69 | — | +0.55 | — | +0.25 | — | +0.66 |

TABLE 13

Optical properties of samples 4 to 6 and "B" before and after exposure to light in unit D

| | Unit D | | | | | | | | | |
|---|---|---|---|---|---|---|---|---|---|---|
| | Comparative sample B | | Sample 4 | | Sample 5 | | Sample 6 | | Blank sample B | |
| Optical parameters | 0 h | 750 h | 0 h | 750 h | 0 h | 750 h | 0 h | 750 h | 0 h | 750 h |
| YI | −0.37 | 0.06 | −0.13 | −0.31 | 0.02 | 0.28 | 0.38 | 0.41 | 1.21 | 1.23 |
| Delta YI | — | +0.43 | — | −0.18 | — | +0.26 | — | +0.03 | — | +0.02 |
| Ty [%] | 87.99 | 89.87 | 87.31 | 88.28 | 87.20 | 87.6 | 88.20 | 87.53 | 89.80 | 89.92 |
| Delta Ty [%] | — | +1.88 | — | +0.97 | — | +0.40 | — | −0.67 | — | +0.12 |

TABLE 14

Mean change in optical parameters Y1 and Ty during exposures A to D

| Change in optical parameters | Comparative sample B | Sample 4 | Sample 5 | Sample 6 |
|---|---|---|---|---|
| Delta YI | +1.14 | +0.69 | +0.43 | +0.29 |
| Delta Ty [%] | +1.57 | +0.79 | +0.27 | −0.25 |

Table 14 clearly shows that the optical parameters for comparative sample B undergo much greater changes than those for the exemplary samples 4, 5 and 6 according to the invention. The increase in the yellowness index can be linked in essence to the degradation of the blue and violet dyes. The values for the blank sample are roughly constant (see Tables 10 to 13); these values represent the change in the basic resin during the light exposure and high-temperature storage experiments. The change in the transmission data Ty also clearly shows the greater stability of the optical properties for samples 4 to 6 according to the invention as compared with the comparative sample B coloured with the comparative dyes.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A composition comprising,
   a) a transparent or translucent polymer or polymer blend in an amount which together with components b) to g) gives 100 wt. %,
   b) optionally 0 ppm to 2500 ppm of one or more stabilisers,
   c) 0.001 ppm to 10,000 ppm of at least one dye comprising structure 1a and/or 1b,

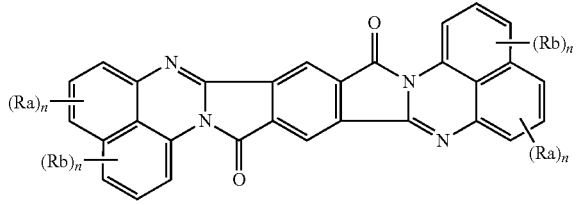

(1a)

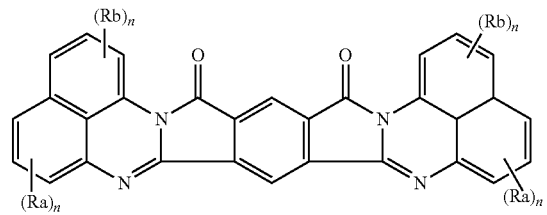

(1b)

wherein
   Ra and Rb, independently of one another, represent a linear or branched alkyl radical, or a halogen;
   n, independently of one another, represents a natural number between 0 and 3, wherein, in the case of n=0, the radical would be hydrogen;
   d) 0.001 ppm to 10,000 ppm of at least one dye selected from the group consisting of dyes differing from dyes having structure 1a and/or 1b based on perinone or indanthrone and dyes based on a phthalocyanine or phthalocyanine complex,
   e) optionally 0 ppm to 3000 ppm of one or more release agents,
   f) optionally 0 ppm to 6000 ppm of one or more UV absorbers,
   g) optionally 0 ppm to 500,000 ppm of one or more further additives.

2. The composition according to claim 1, wherein the transparent or translucent polymer or polymer blend comprises polycarbonate.

3. The composition according to claim 1, wherein components c) and d) are each included in a proportion of 0.01 ppm to 5 ppm in addition to components a), b), e), f) and g).

4. The composition according to claim 1, wherein components c) and d) are each included in a proportion of 10 ppm to 500 ppm in addition to components a), b), e), f) and g).

5. The composition according to claim 1, wherein component d) is a dye selected from the group consisting of dyes having structures 2a, 2b, 3a, 3b and 4

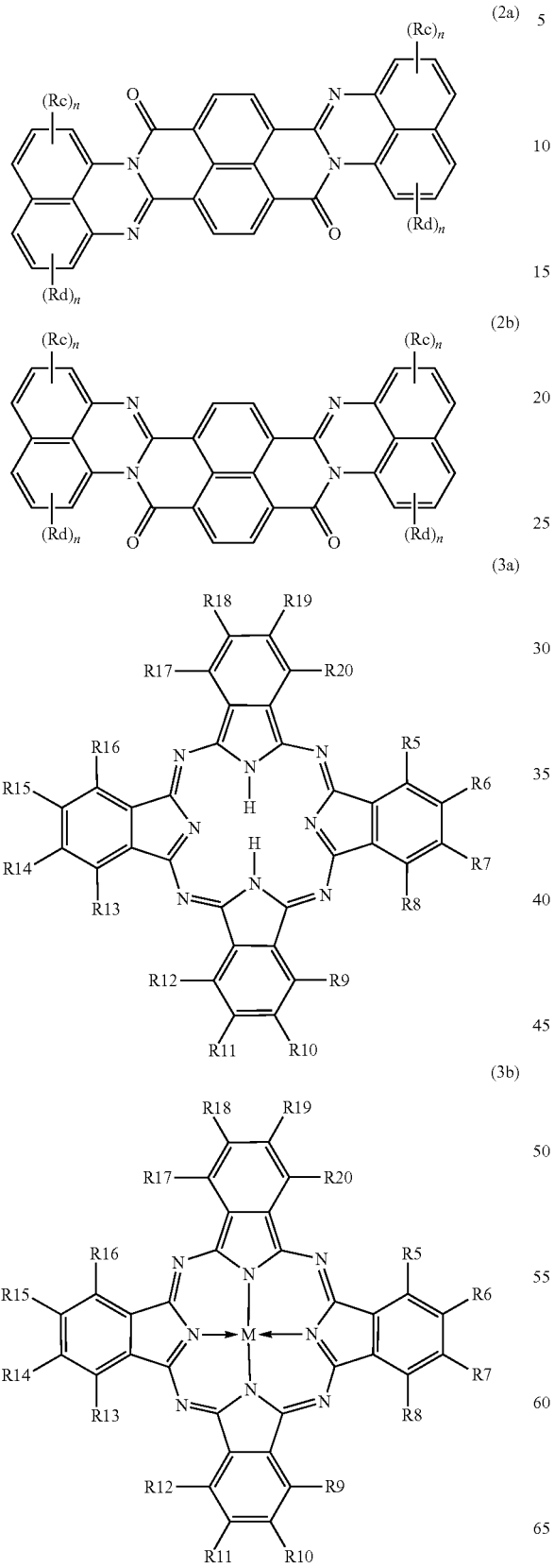

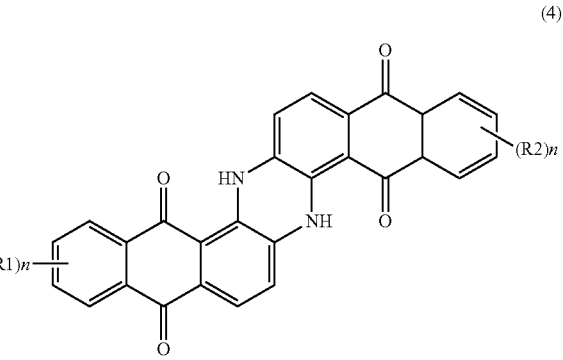

wherein for (2a) and (2b)
Rc and Rd, independently of one another, represent a linear or branched alkyl radical, or halogen;
n, independently of one another, represents a natural number between 0 and 3, wherein, in the case of n=0, the radical would be hydrogen;
and wherein for (3a) and (3b)
the radicals R(5-20) represent, independently of one another, hydrogen, methyl, ethyl, propyl, isopropyl, butyl, isobutyl, tert-butyl, pentyl, neopentyl, hexyl, thexyl, fluorine, chlorine, bromine, sulfone or CN, and
M represents an element selected from the group consisting of aluminium, nickel, cobalt, iron, zinc, copper and manganese;

wherein
R1 and R2, independently of one another, represents a linear or branched alkyl radical, or halogen;
n denotes a natural number between 0 and 4.

6. The composition according to claim 1, wherein the ratio of c) to d) is 1:1.

7. The composition according to claim 1, wherein components c) and d) are used as mixtures of isomers, and wherein the proportion of isomers in the individual mixtures are 1:1.

8. The composition according to claim 1, wherein components c) and d) are each used as pure isomers.

9. The composition according to claim 1, wherein the composition has a transmission, measured on 4-mm-thick specimens in accordance with ISO 13468-2, of at least 80% and a haze of at most 5%.

10. The composition according to claim 1, wherein the composition is translucent and has a transmission (measured on 4-mm-thick specimens in accordance with ISO 13468-2) of less than 80% and greater than 20% and/or a haze of greater than 5%.

11. The composition according to claim 1, wherein component c is a substance corresponding to structures 1a and 1b with n=0 in all rings, such that all Ra and Rb are hydrogen, and wherein structures 1a and 1b are present side by side in a ratio of 1:1.

12. The composition according to claim 1, wherein component d is a substance corresponding to structures 2a and 2b with n=0 in all rings, such that all Ra and Rb are hydrogen, and wherein structures 2a and 2b are present side by side in a ratio of 1:1.

13. The composition according to claim 1, wherein component d is a substance corresponding to structure 3b, wherein all R(5-20) are hydrogen and M is Cu.

14. The composition according to claim 1, wherein component d is a substance corresponding to structure 4, wherein R1 and R2 are hydrogen.

15. The composition according to claim 11, wherein component d is a substance corresponding to structures 2a and 2b with n=0 in all rings, such that all Ra and Rb are hydrogen, and wherein structures 2a and 2b are present side by side in a ratio of 1:1.

16. The composition according to claim 11, wherein component d is a substance corresponding to structure 3b, wherein all R(5-20) are hydrogen and M is Cu.

17. The composition according to claim 11, wherein component d is a substance corresponding to structure 4, wherein R1 and R2 are hydrogen.

18. A colored molded object obtained from a composition comprising
   a) 0.001 ppm to 10,000 ppm of at least one dye comprising structure 1a and/or 1b,

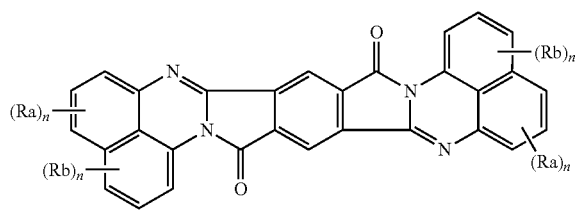
(1a)

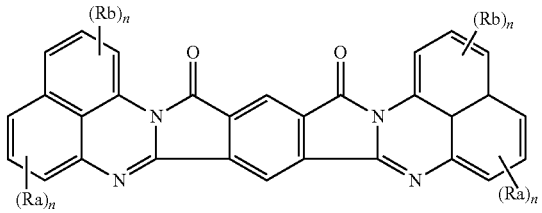
(1b)

wherein
   Ra and Rb, independently of one another, represent a linear or branched alkyl radical, or a halogen;
   n, independently of one another, represents a natural number between 0 and 3, wherein, in the case of n=0, the radical would be hydrogen; and
   b) 0.001 ppm to 10,000 ppm of at least one dye selected from the group consisting of dyes differing from dyes having structure 1a and/or 1b based on perinone or indanthrone and dyes based on a phthalocyanine or phthalocyanine complex,
   wherein the colored molded objects have a high color stability when exposed to LED light.

19. An optical component obtained from moulding compositions which comprises compositions according to claim 1.

20. A multi-layer system comprising the composition according to claim 1.

* * * * *